(12) United States Patent
Yoon et al.

(10) Patent No.: US 11,814,452 B2
(45) Date of Patent: Nov. 14, 2023

(54) AZIRIDINE POLYMERS WHOSE CHEMICAL STRUCTURAL CHANGES ARE INDUCED BY MECHANICAL FORCE

(71) Applicant: Korea University Research and Business Foundation, Seoul (KR)

(72) Inventors: Hyo Jae Yoon, Seoul (KR); Sangmin Jung, Daejeon (KR)

(73) Assignee: Korea University Research and Business Foundation, Seoul (KR)

( * ) Notice: Subject to any disclaimer, the term of this patent is extended or adjusted under 35 U.S.C. 154(b) by 21 days.

(21) Appl. No.: 17/314,163

(22) Filed: May 7, 2021

(65) Prior Publication Data

US 2021/0371557 A1 Dec. 2, 2021

(30) Foreign Application Priority Data

Jun. 2, 2020 (KR) ........................ 10-2020-0066690

(51) Int. Cl.
*C08F 136/20* (2006.01)
(52) U.S. Cl.
CPC ................... *C08F 136/20* (2013.01)
(58) Field of Classification Search
CPC .................................................... C08F 136/12
See application file for complete search history.

(56) References Cited

FOREIGN PATENT DOCUMENTS

KR 10-2016-0065833 A 6/2016

OTHER PUBLICATIONS

Jung, Sangmin et al., "Mechanical Force Induces Ylide-Free Cycloaddition of Nonscissible Aziridines," Korea University, Jan. 16, 2020 (pp. 1-8) (Year: 2020).*
"Daily Program"., *The 20th General Assembly of the Federation of Asian Chemical Societies and The 18th Asian Chemical Congress*, Dec. 8-12, 2019 Taipei, Taiwan (pp. 1-74).
Jung, Sangmin et al., "Mechanical Force Induces Ylide-Free Cycloaddition of Nonscissible Aziridines", *Korea University*, Jan. 16, 2020 (pp. 1-8).
Yang, Yong et al., "Main-Chain Calix[4]arene Elastomers by Ring-Opening Metathesis Polymerization," Macromolecules, 40, 21, 2007 (pp. 7437-7440).
Klukovich, Hope M., et al., "Tension Trapping of Carbonyl Ylides Facilitated by a Change in Polymer Backbone," *Journal of the American Chemical Society*, 134, 23, 2012 (pp. 9577-9580).
You, Wei, et al., "Highly conductive and chemically stable alkaline anion exchange membranes via ROMP of trans-cyclooctene derivatives," *Proceedings of the National Academy of Sciences*, 116, 20, 2019 (pp. 9729-9734).
Korean Notice of Allowance dated May 24, 2021 in counterpart Korean Patent Application No. 10-2020-0066690 (2 pages in Korean).

* cited by examiner

*Primary Examiner* — Robert D Harlan
(74) *Attorney, Agent, or Firm* — NSIP Law

(57) ABSTRACT

Disclosed are new polymeric materials that respond to a mechanical force. The novel polymeric compounds contain an isomer of aziridine, a three-membered N-heterocyclic compound. Also disclosed are methods for preparing the polymeric compounds. Mechanical force-induced cycloaddition of aziridines as mechanophores yields stereospecific products without covalent bond cleavage of aziridines. That is, a mechanical force makes the mechanochemical products stereospecific. The stereospecific products prepared from the isomeric mechanophores by a mechanical force can be widely used in various industrial fields, including new materials.

14 Claims, 17 Drawing Sheets

AZIRIDINE POLYMERS WHOSE CHEMICAL STRUCTURAL CHANGES ARE INDUCED BY MECHANICAL FORCE

BACKGROUND OF THE INVENTION

1. Field of the Invention

The present invention relates to new polymeric materials that respond to a mechanical force. More specifically, the present invention relates to novel polymeric compounds containing an isomer of aziridine, a three-membered N-heterocyclic compound, and methods for preparing the polymeric compounds.

2. Description of the Related Art

In mechanochemically responsive polymers, strong pulling or shearing forces along the backbone of macromolecules transduced by a mechanical force selectively break the chemical bonds of unstable chemical structures (mechanophores) embedded on the backbone and trigger chemical reactions at the mechanophores. These polymers have found several applications, including in structure engineering, catalysis, sensors, patterning, recycling of resources, materials transfer, and gating to regulate other reactions.

Such systems can activate covalent and coordination bonds and change the electrical and optical properties of polymers. The activation of mechanophores also allows one to steer chemical reactions toward routes that are inaccessible under traditional thermal and photochemical conditions. The common approach for mechanochemical studies is to harness vulnerable chemical structures that have weak bond energies or high strains as mechanophores. Thus, previously known mechanophores undergo bond scission and isomerization upon exposure to mechanical forces.

However, since chemical reactions of presently known mechanophores are determined by the vector components of mechanical force, the mechanophores lose their stereospecificity and the chemical reactions are biased. That is, cleavage of covalent bonds is responsible for the biased chemical reactions. Until now, there has been no report on mechanophores that are chemically and structurally stable compared to previously known mechanophores and thus form stereospecific products upon application of mechanical force.

Klukovich et al. reported the incorporation of heterocyclic epoxides similar to aziridines into polynorbornene (Hope M. Klukovich, et al., J. Am. Chem. Soc. 2012, 134, 9577-9580). Isomerization, ring-opening, and cycloaddition reactions of the epoxides by a mechanical force are disclosed in this report. However, the cycloaddition of the epoxides is not stereospecific.

Hikinboth et al. reported the incorporation of polyethylene glycol into the ends of cis- and trans-benzocyclobutenes as square cyclic compounds (Jeremy M. Lenhardt, et al., Science 2010, 329, 1057-1060). This report also discloses that the cis- and trans-benzocyclobutenes form the same intermediate ((E,E)-ortho-quinodimethide diene) upon application of mechanical force. That is, the formation of the same intermediate is regardless of the type of the isomers and the cycloaddition reaction yields only one steric structure.

In other words, a mechanical force breaks weak chemical bonds in the isomeric mechanophores, leading to the formation of isomers with the same structure and selective synthesis of one product that loses stereospecificity. So far it has not been reported that stereospecific products are formed without covalent bond cleavage in isomeric mechanophores.

The present inventors have earnestly and intensively conducted research to develop novel polymers as stereospecific products that can be prepared without undergoing chemical bond breakage by a mechanical force, and as a result, found that when a mechanical force is applied to cis- and trans-isomers of aziridine, a three-membered N-heterocyclic compound, the covalent bond of aziridine is not cleaved. The present inventors have also found that cycloaddition of the isomers leads to the formation of stereospecific products. The present invention has been accomplished based on these findings.

SUMMARY OF THE INVENTION

One object of the present invention is to provide a polymeric compound including a repeating unit represented by Formula 1-1:

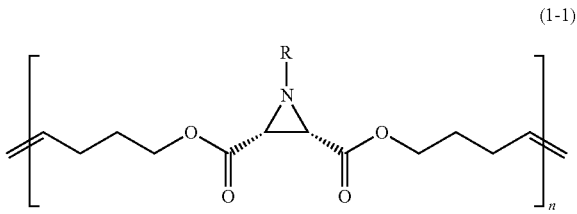

(1-1)

and a repeating unit represented by Formula 1-2:

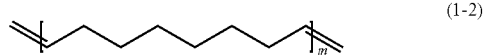

(1-2)

A further object of the present invention is to provide a polymeric compound including a repeating unit represented by Formula 2-1:

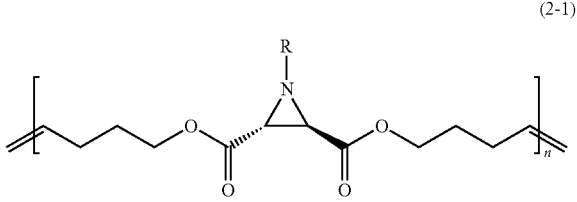

(2-1)

and a repeating unit represented by Formula 2-2:

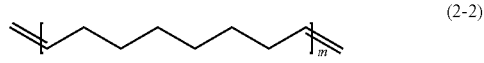

(2-2)

Another object of the present invention is to provide a method for preparing a polymeric compound including a repeating unit represented by Formula 1-1:

(1-1)

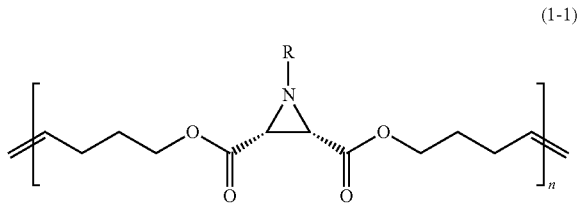

and a repeating unit represented by Formula 1-2:

(1-2)

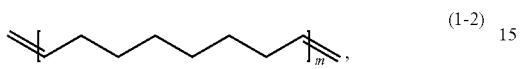

the method including polymerizing cis-cyclooctene represented by Formula 3:

(3)

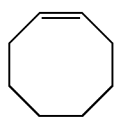

and an aziridine monomer represented by Formula 4:

(4)

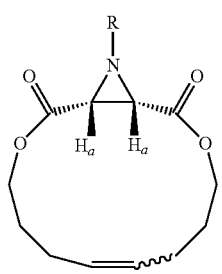

Still another object of the present invention is to provide a method for preparing a polymeric compound including a repeating unit represented by Formula 2-1:

(2-1)

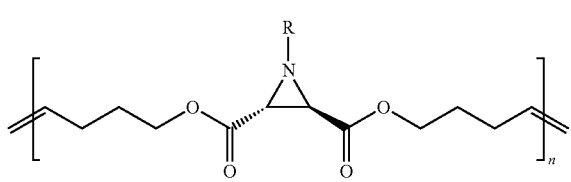

and a repeating unit represented by Formula 2-2:

(2-2)

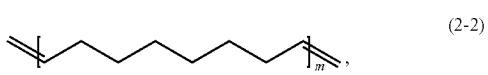

the method including polymerizing cis-cyclooctene represented by Formula 3:

(3)

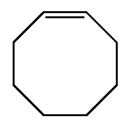

and an aziridine monomer represented by Formula 5:

(5)

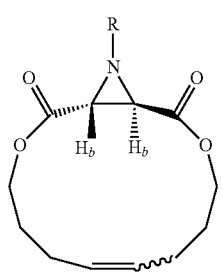

One aspect of the present invention provides a polymeric compound including a repeating unit represented by Formula 1-1:

(1-1)

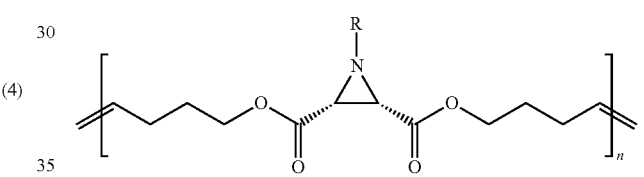

and a repeating unit represented by Formula 1-2:

(1-2)

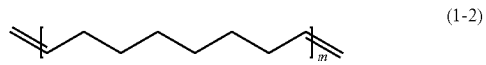

A further aspect of the present invention provides a polymeric compound including a repeating unit represented by Formula 2-1:

(2-1)

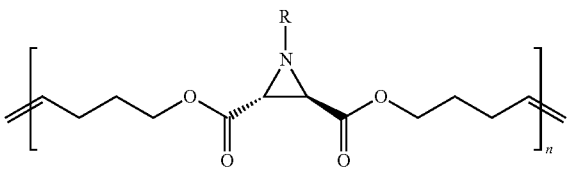

and a repeating unit represented by Formula 2-2:

(2-2)

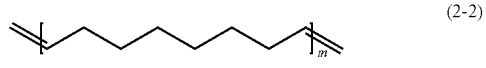

Another aspect of the present invention provides a method for preparing a polymeric compound including a repeating unit represented by Formula 1-1:

(1-1)

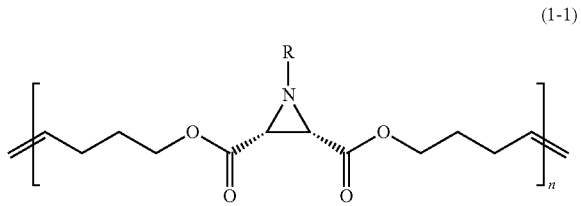

and a repeating unit represented by Formula 1-2:

(1-2)

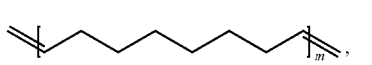

the method including polymerizing cis-cyclooctene represented by Formula 3:

(3)

and an aziridine monomer represented by Formula 4:

(4)

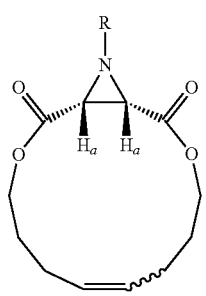

Yet another aspect of the present invention provides a method for preparing a polymeric compound including a repeating unit represented by Formula 2-1:

(2-1)

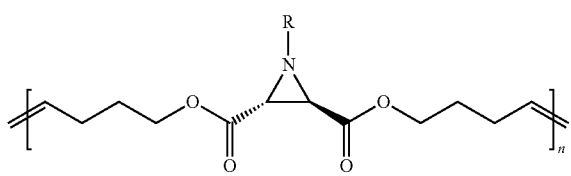

and a repeating unit represented by Formula 2-2:

(2-2)

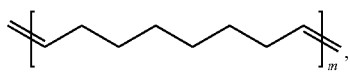

the method including polymerizing cis-cyclooctene represented by Formula 3:

(3)

and an aziridine monomer represented by Formula 5:

(5)

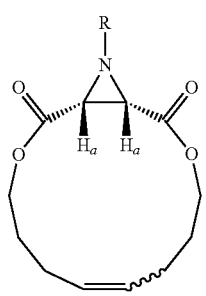

Mechanical force-induced cycloaddition of aziridines as mechanophores yields stereospecific products without covalent bond cleavage of aziridines. That is, a mechanical force makes the mechanochemical products stereospecific. The stereospecific products prepared from the isomeric mechanophores by a mechanical force can be widely used in various industrial fields, including new materials.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE INVENTION

Unless otherwise defined, all technical and scientific terms used herein have the same meaning as commonly understood by one of ordinary skill in the art to which this invention belongs. In general, the nomenclature used herein is well known and commonly employed in the art.

Figure 1:
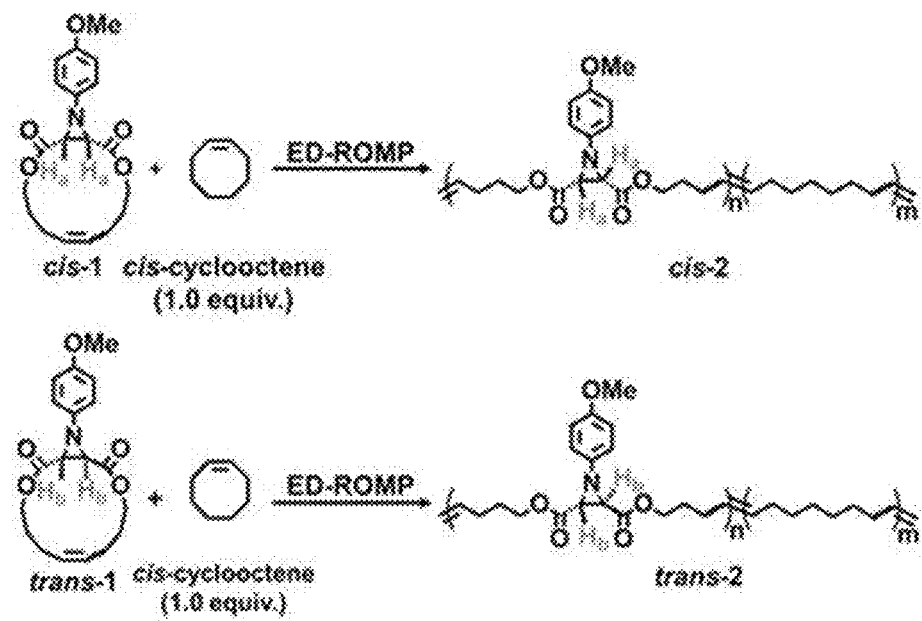
FIG. 1 shows reaction schemes for the synthesis of N-(4-methoxyphenyl) cis- and trans-aziridine copolymers (cis-2 and trans-2) through entropically driven ring-opening metathesis copolymerization.

The present invention uses a bottom-up approach to synthesize novel polymers containing a large number of aziridine rings by polymerization of corresponding monomers. cis- and trans-diethyl 1-(4-methoxyphenyl)aziridines (cis-1 and trans-1 in FIG. 1) were synthesized from cis- and trans-N-(4-methoxyphenyl)aziridine-2,3-dicarboxylates in two steps. The aziridine-containing polymers (cis-2 and trans-2 in FIG. 1) were synthesized by entropically-driven ring opening metathesis polymerization with 1:1 molar ratio of cis-cyclooctene and the aziridine monomer (cis-1 or trans-1 in FIG. 1) in the presence of Grubbs $2^{nd}$ generation catalyst (FIG. 1).

Figure 2:
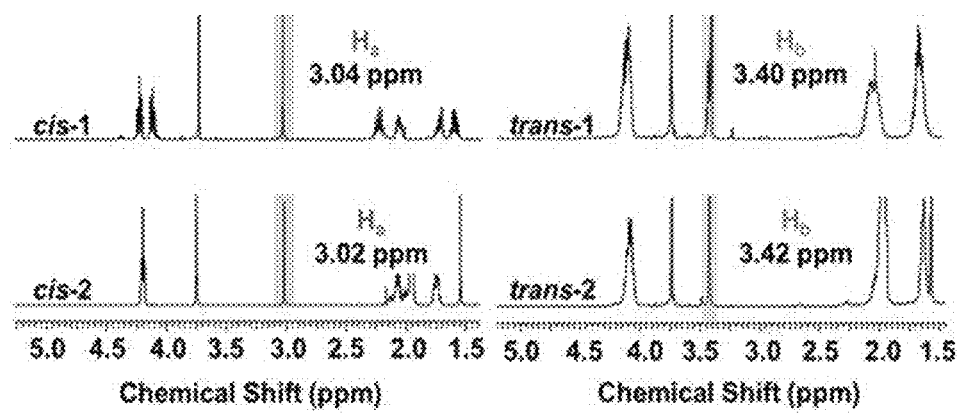
FIG. 2 compares $^1$H NMR spectra for monomers (cis-1 and trans-1) and polymers (cis-2 and trans-2)
Figure 3:
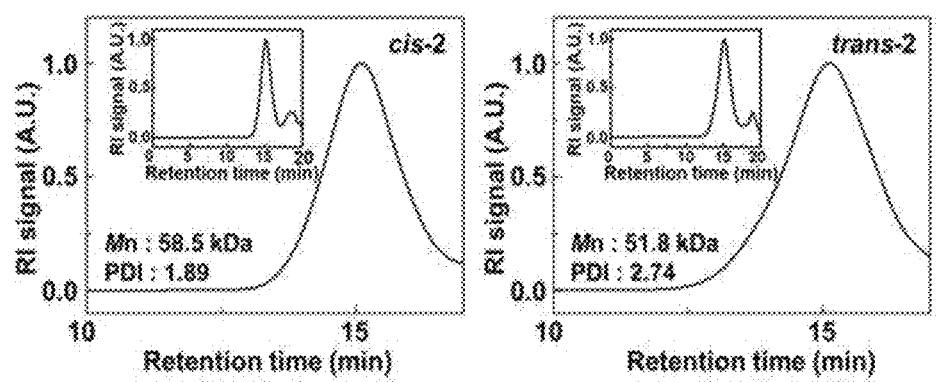
FIG. 3 shows size exclusion chromatography (SEC) traces of cis-2 and trans-2. Insets show the full SEC plots.

In the Examples section that follows, the presence of a large number of aziridine rings in each of the synthesized polymers was confirmed by $^1$H NMR spectroscopy (FIG. 2) and gel permeation chromatography (FIG. 3).

In the Examples section that follows, the covalent bonds in the aziridine rings embedded on the backbone of each of the synthesized polymers were not cleaved by a mechanical force, which was confirmed through mechanochemical isomerization. The addition of the reactant for cycloaddition was found to form trans- and cis-pyrrolines as stereospecific products from cis- and trans-aziridines, respectively.

In the Examples section that follows, an experiment was conducted using computational chemistry to study the above-described mechanochemical properties. Molecular structures and electron densities were calculated while increasing the distance between both ends of the cis- and trans-aziridines. At the end of calculation, cis- and trans-aziridines underwent C—C bond cleavage at Δd=1.70 and 1.65 Å, respectively. Further, the increased distance between the carbonyl groups located at both carbons of aziridine by a mechanical force led to an increase in the electron density of the aziridine carbons.

In one aspect, the present invention is directed to a polymeric compound including a repeating unit represented by Formula 1-1:

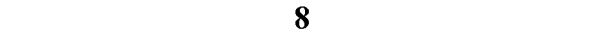

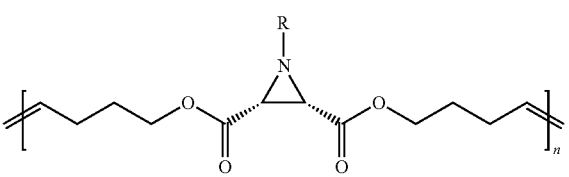

wherein R is preferably

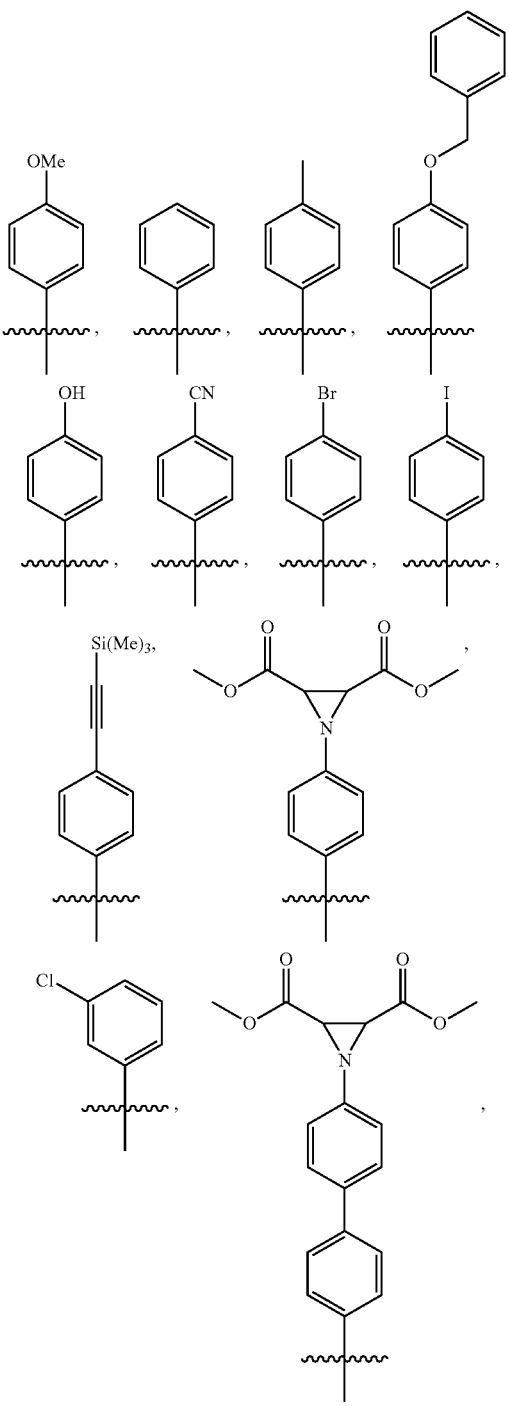

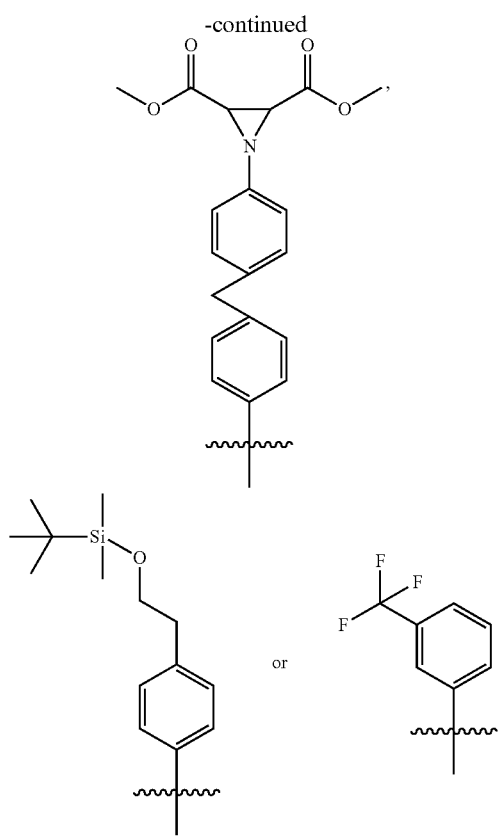
and n is preferably an integer from 123 to 125, and a repeating unit represented by Formula 1-2:
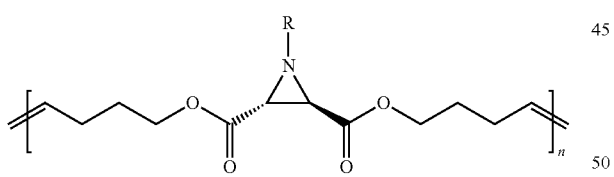
(1-2)
wherein m is preferably an integer from 123 to 125.
In a further aspect, the present invention is directed to a polymeric compound including a repeating unit represented by Formula 2-1:
(2-1)
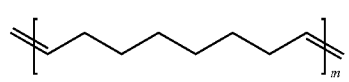
wherein R is preferably wherein R is preferably
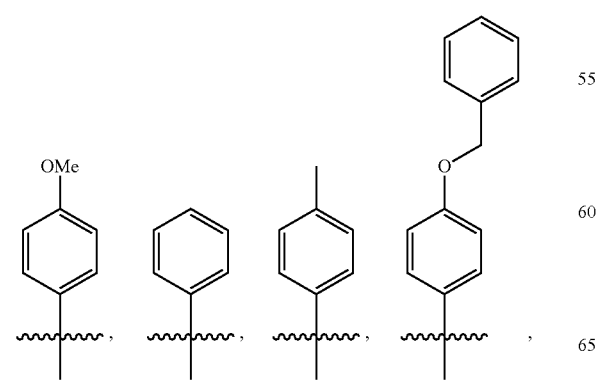
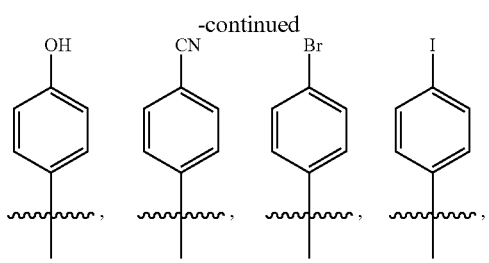
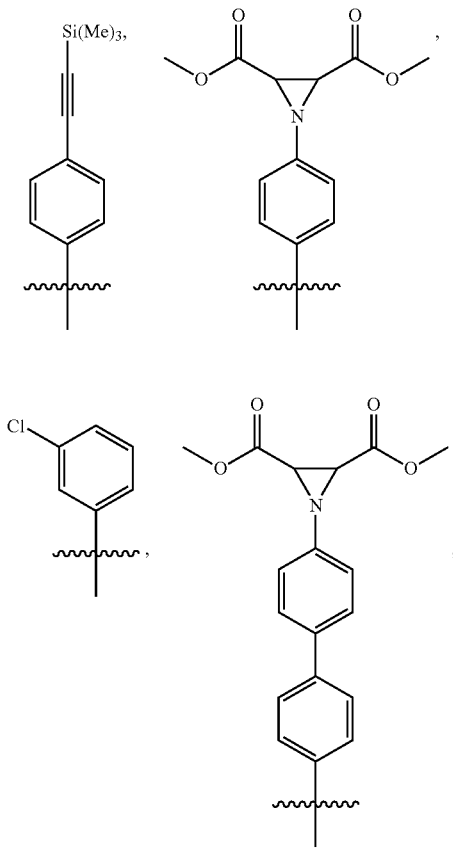
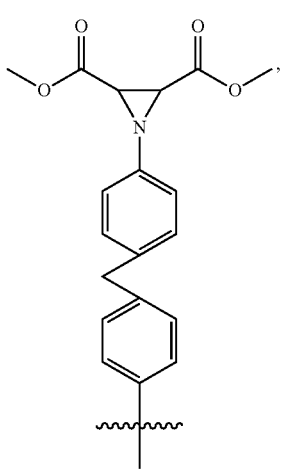

-continued

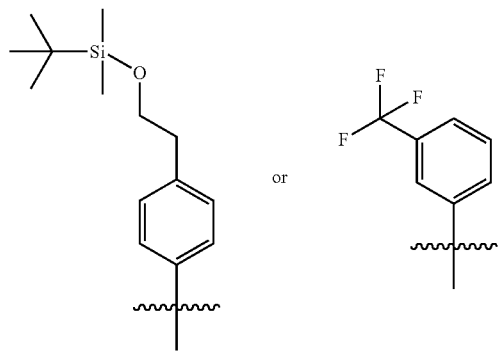

and n is preferably an integer from 108 to 110, and a repeating unit represented by Formula 2-2:

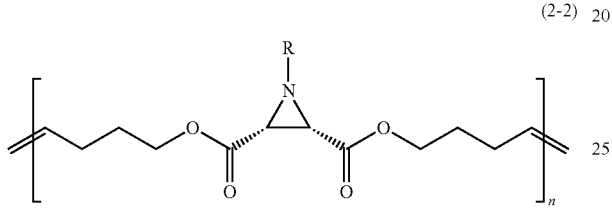
(2-2)

wherein m is preferably an integer from 108 to 110.

In another aspect, the present invention is directed to a method for preparing a polymeric compound including a repeating unit represented by Formula 1-1:

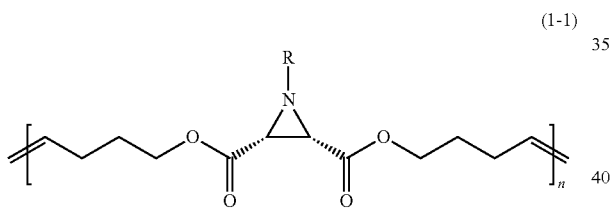
(1-1)

wherein R is preferably wherein R is preferably

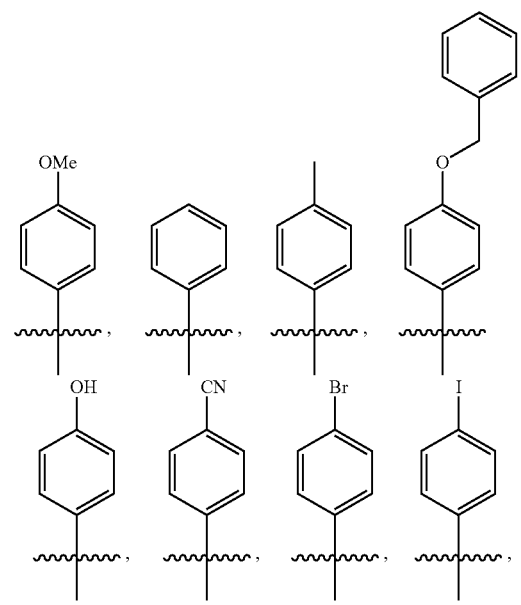

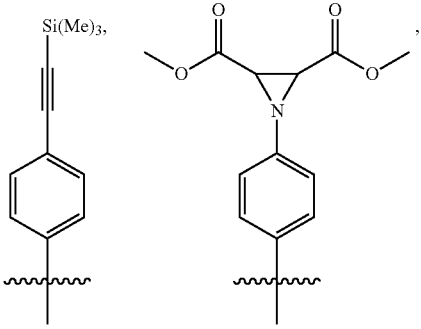

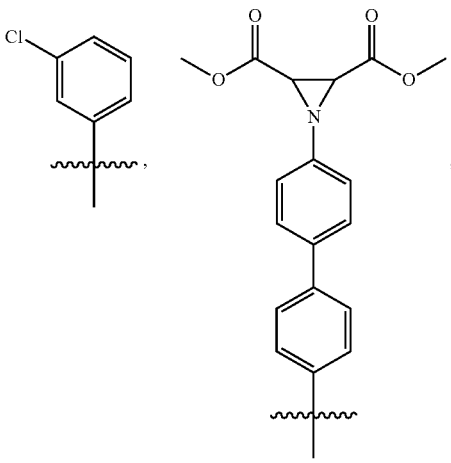

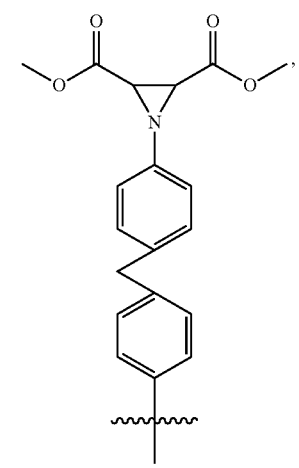

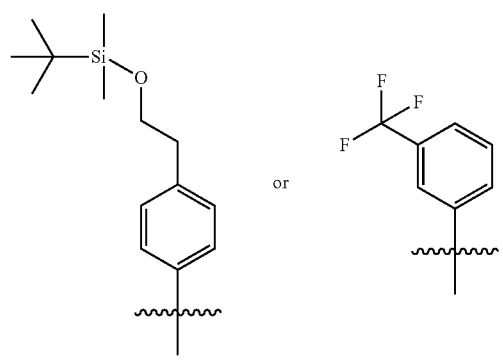

and n is preferably an integer from 123 to 125, and a repeating unit represented by Formula 1-2:

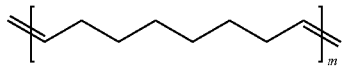

(1-2)

wherein m is preferably an integer from 123 to 125, the method including polymerizing cis-cyclooctene represented by Formula 3:

(3)

and an aziridine monomer represented by Formula 4:

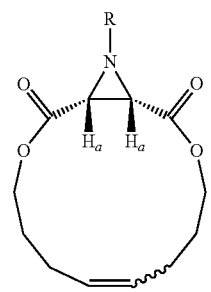

(4)

wherein R is as defined in Formula 1-1.

In yet another aspect, the present invention is directed to a method for preparing a polymeric compound including a repeating unit represented by Formula 2-1:

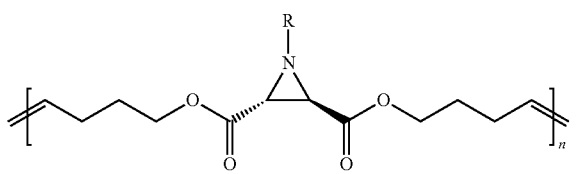

(2-1)

wherein R is preferably wherein R is preferably

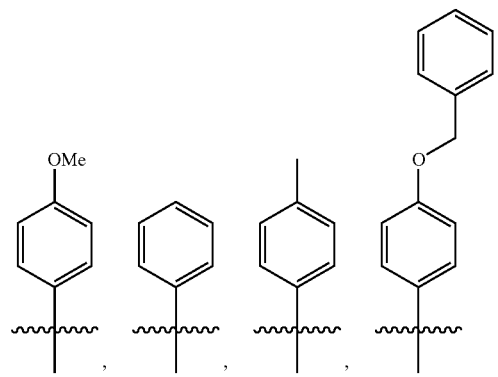

-continued

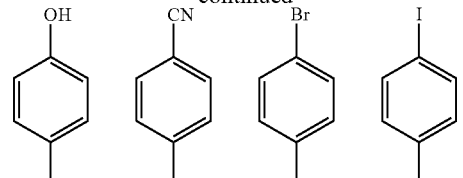

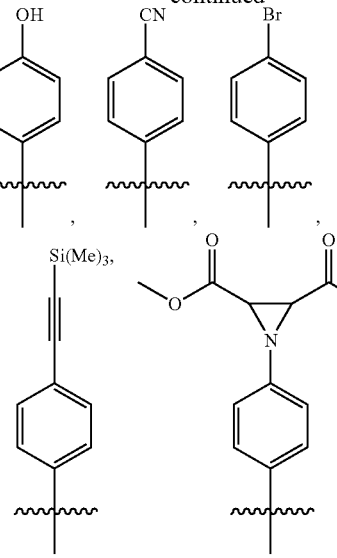

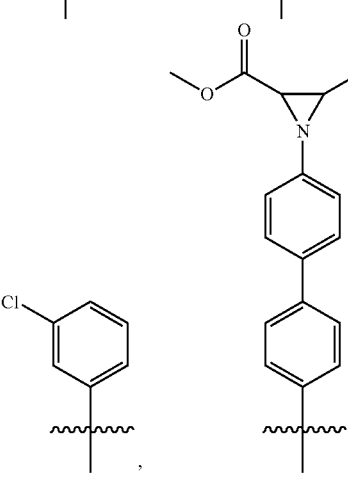

or and n is preferably an integer from 108 to 110, and a repeating unit represented by Formula 2-2:

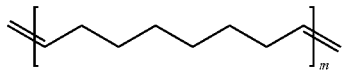

(2-2)

wherein m is preferably an integer from 108 to 110,
the method including polymerizing cis-cyclooctene represented by Formula 3:

(3)

and an aziridine monomer represented by Formula 5:

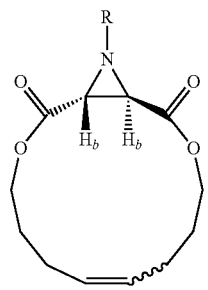

(5)

wherein R is as defined in Formula 2-1.
The polymeric compounds of the present invention are represented by Formula 1:

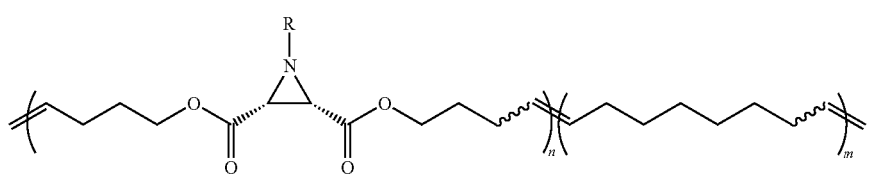

(1)

wherein
R is preferably wherein R is preferably

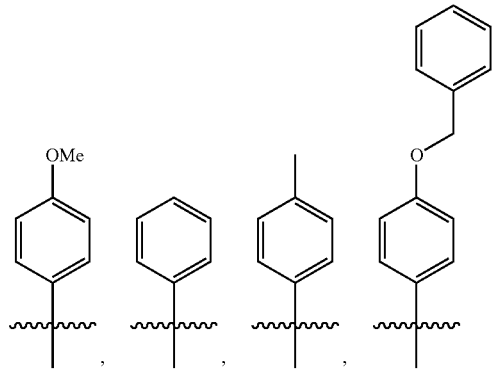

-continued

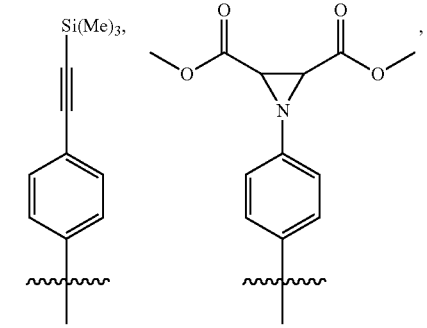

-continued

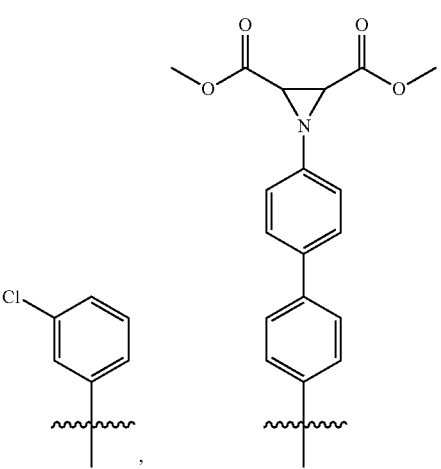

-continued

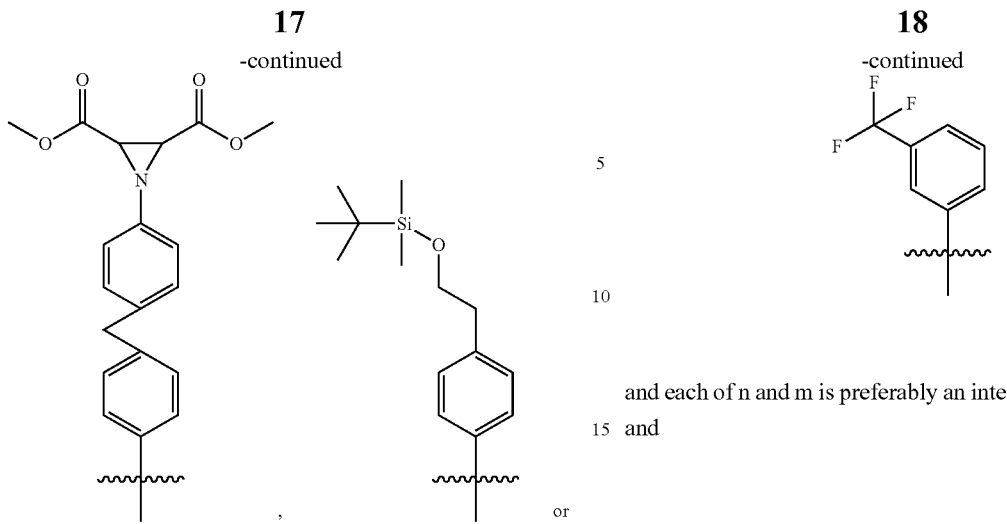

, or

-continued

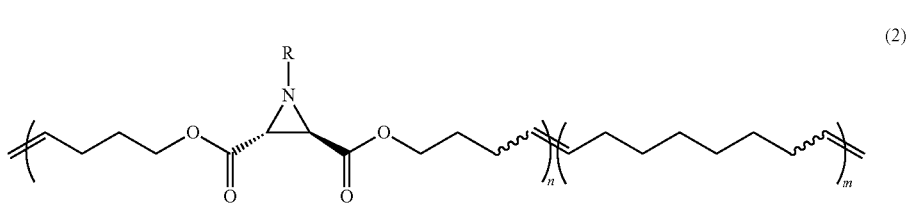

and each of n and m is preferably an integer from 123 to 125, and

Formula 2:

$$\text{(2)}$$

wherein R is preferably as defined in Formula 1 and each of n and m is preferably an integer from 108 to 110.

The polymeric compounds of the present invention may be prepared by mechanical force-induced cycloaddition.

The polymerization may be performed by entropically driven ring-opening metathesis copolymerization.

In the present invention, the cis-cyclooctene and the aziridine monomer are preferably used in a molar ratio of 1:0.5 to 1:1.5, more preferably 1:1.

The polymerization may be performed in the presence of Grubbs $2^{nd}$ catalyst.

The present invention will be explained in more detail with reference to the following examples. It will be evident to those skilled in the art that these examples are merely for illustrative purposes and are not to be construed as limiting the scope of the present invention. Therefore, the true scope of the present invention is defined by the appended claims and their equivalents.

Example 1: Experimental Methods 1-1: Materials

All reagents were used as supplied unless otherwise specified. All organic solvents were purchased from Daejung (Korea) while water was purified using an Aqua MAX-Basic System (deionized water, electrical resistivity of which is ~18.2 MΩ·cm).

1-2. Characterization $^1$H and $^{13}$C NMR spectra were recorded on a Bruker FT-NMR Advance-500 using $CDCl_3$ as solvent and residual solvents as an internal standard. Chemical shifts are expressed in parts per million (ppm) related to internal TMS and coupling constant (J) are in Hertz. ESI mass spectrometry measurements were recorded on a Bruker compat Q-TOF MS.

1-3. Size Exclusion Chromatography

Size exclusion chromatography (SEC) analyses were performed with an Agilent 1100 pump, a RI detector, Agilent G1362A RID Interferometric Refractometer (RI) and a series of two Agilent PL gel columns (7.5×300 mm, 20 μm MIXED-A) and a 10 μm MIXED-A in THF at 35° C. Molecular weights were calculated using do/dc values, which were obtained for each injection by assuming 100% mass elution from the columns.

1-4. Ultrasound Sonication

Ultrasound experiments were performed in inhibitor-free THF on a Vibracell Model VCX500 operating at 20 kHz with a 25.0 mm replaceable titanium tip probe from Sonics and Materials (http:www.sonics.biz/). Each sonication was performed in a 1 mg/mL polymer or small molecule solution in inhibitor-free THF deoxygenated with bubbling Na for 30 minutes prior to sonication. The temperature was kept at 4-8° C. in an ice-water bath and the sonication pulse sequence was set to 1 s on/1 s off.

Example 2: Synthesis of Aziridine Polymeric Compounds 2-1: Synthesis of cis-N-(4-methoxyphenyl)aziridine Copolymer (cis-2)

cis-N-(4-methoxyphenyl)aziridine copolymer (cis-2) was synthesized following the steps shown in Reaction Scheme 1:

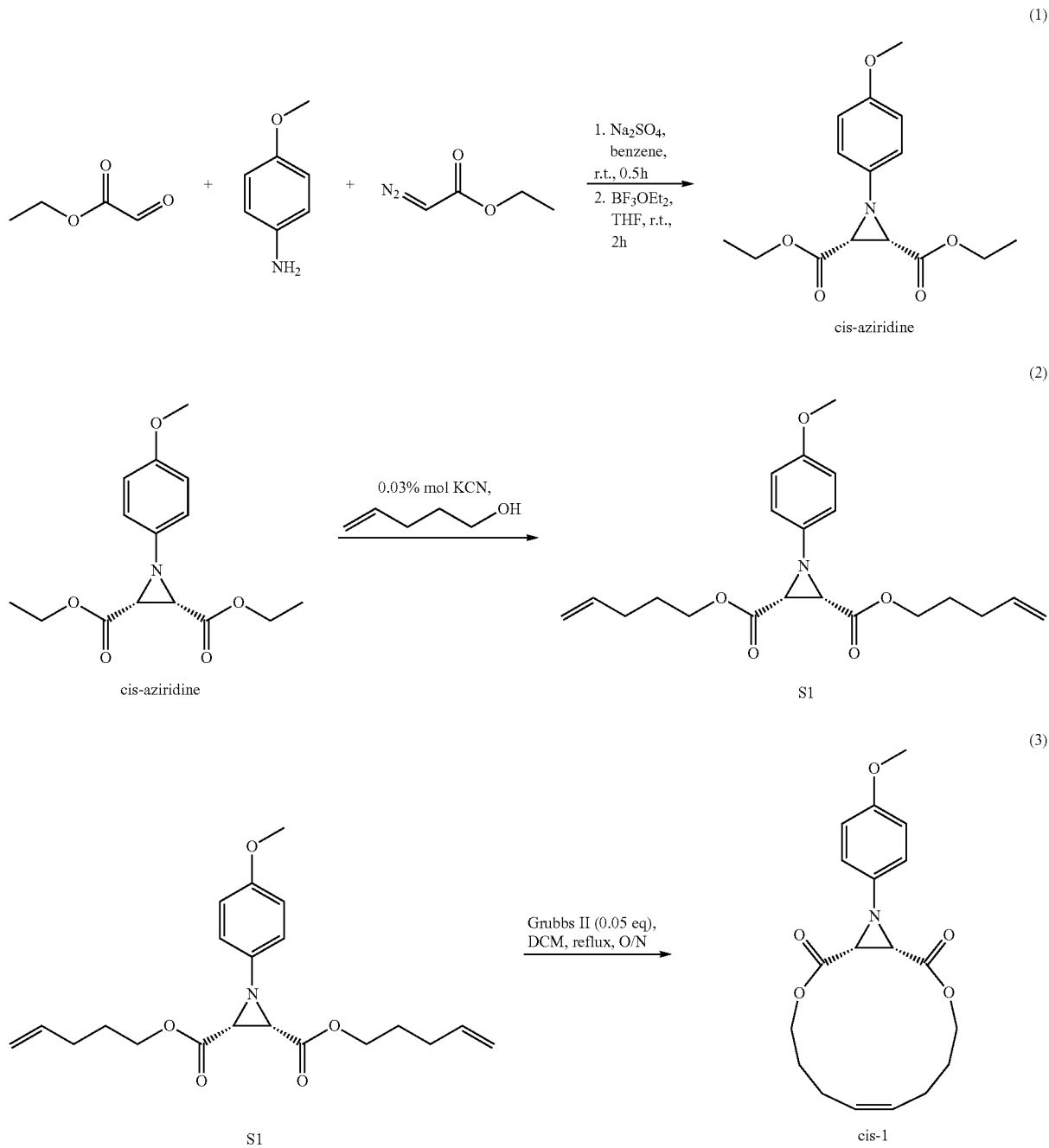

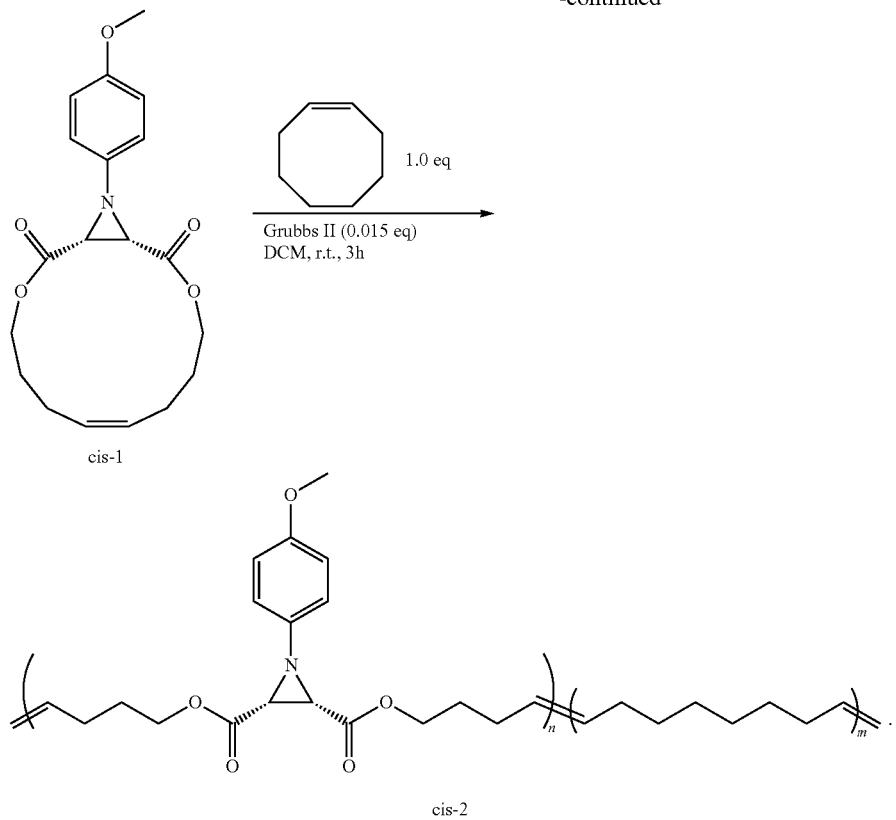

2. Synthesis of (2R,3S)-diethyl 1-(4-methoxyphenyl)aziridine-2,3-dicarboxylate (cis-aziridine)

A mixture of 4-methoxyaniline (1.08 g, 8.8 mmol), alkyl glyoxylate (1.34 g, 13.2 mmol) and anhydrous Na$_2$SO$_4$ (9.00 g) in benzene (200 mL) was stirred in a round-bottom flask for 30 min. Na$_2$SO$_4$ was filtered off under reduced pressure, and the solvent was removed with an oil pump equipped with a cooling trap. The residue was redissolved in ether (180 ml), and 0.5 mL of boron trifluoride etherate were added. A solution of alkyl diazoacetate (1.10 g, 9.4 mmol) in dry ether (20 ml) was added dropwise and the mixture was stirred for 2 h and quenched with 1.0 mL of triethylamine. The mixture was diluted with water, extracted with DCM and dried over MgSO$_4$. The crude product was purified by silica gel column chromatography (25% EtOAc in Hexanes) to afford cis-aziridine in a yield of 90%.

$^1$H NMR (500 MHz, CDCl$_3$) δ: 6.96 (d, J=9.2 Hz, 2H), 6.80 (d, J=9.2 Hz, 2H), 4.28 (q, J=7.1 Hz, 4H), 3.76 (s, 3H), 3.02 (s, 2H), 1.32 (t, J=7.2 Hz, 6H).

$^{13}$C NMR (500 MHz, CDCl$_3$) δ: 14.12, 43.27, 55.48, 61.80, 114.37, 120.92, 144.18, 156.24, 167.07 ppm.

HRMS (ESI) m/z: [M+Na]$^+$ calcd for C$_{15}$H$_{19}$NNaO$_5$: 316.1161; found: 316.1155.

(2) Synthesis of (2R,3S)-di(pent-4-en-1-yl) 1-(4-methoxyphenyl)aziridine-2,3-dicarboxylate (S1)

A mixture of cis-aziridine (1.25 g, 4.26 mmol) and potassium cyanide (0.03 mol %) in pent-4-en-1-ol (20 mL) was stirred in a round-bottom flask overnight at 60° C. After the mixture was diluted with water, the organic layer was extracted with DCM and dried over MgSO$_4$. The crude product was purified by silica gel column chromatography (20% EtOAc in Hexanes) to afford S1 in a yield of 47%.

$^1$H NMR (500 MHz, CDCl$_3$) δ: 6.95 (d, J=8.9 Hz, 2H), 6.80 (d, J=8.9 Hz, 2H), 5.81 (m, 2H), 5.04 (m, 4H), 4.22 (t, 4H), 3.76 (s, 3H), 3.03 (s, 2H), 2.15 (m, 4H), 1.80 (m, 4H).

$^{13}$C NMR (500 MHz, CDCl$_3$) δ: 27.61, 29.67, 43.25, 55.49, 65.25, 114.39, 115.43, 120.89, 137.25, 144.20, 156.25, 167.05 ppm.

HRMS (ESI) m/z: [M+Na]$^+$ calcd for C$_{21}$H$_{27}$NNaO$_5$: 396.1787; found: 396.1781.

(3) Synthesis of (1R,14S)-15-(4-methoxyphenyl)-3,12-dioxa-15-azabicyclo[12.1.0]pentadec-7-ene-2,13-dione (cis-1)

S1 (0.40 g, 1.0 mmol) was dissolved in DCM (100 mL). The solution was bubbled with N$_2$ for 30 min at room temperature. Grubbs second generation catalyst (0.04 g, 0.05 mmol) was added to the solution under N$_2$. The resulting solution was refluxed for 18 h. The reaction was quenched with the addition of 1 mL of ethyl vinyl ether and the mixture was stirred for 30 min. The reaction solution was cooled to room temperature and the solvent was removed with an oil pump equipped with a cooling trap. After the mixture was diluted with water, the organic layer was extracted with DCM and dried over MgSO$_4$. The crude product was purified by silica gel column chromatography (eluent: 25% EtOAc in Hexanes) to afford cis-1 in a yield of 80%.

$^1$H NMR (500 MHz, CDCl$_3$) δ: 6.95 (d, J=8.9 Hz, 2H), 6.79 (d, J=8.9 Hz, 2H), 5.36 (m, 2H), 4.19 (m, 4H), 3.75 (s, 3H), 3.04 (s, 2H), 2.12 (m, 4H), 1.67 (m, 4H).

$^{13}$C NMR (500 MHz, CDCl$_3$) δ: 22.98, 28.07, 43.35, 55.44, 63.97, 114.34, 120.76, 129.46, 144.12, 156.16, 166.87 ppm.

HRMS (ESI) m/z: [M+Na]$^+$ calcd for C$_{19}$H$_{23}$NNaO$_5$: 368.1474; found: 368.1468.

(4) Synthesis of cis-N-(4-methoxyphenyl) aziridine copolymer (cis-2)

cis-1 (0.14 g, 0.4 mmol) and cis-cyclooctene (0.044 g, 0.4 mmol) were dissolved in 0.1 mL of DCM in a round-bottom flask. 1.64 mg of Grubbs second generation catalyst was dissolved in 1 mL of DCM. 0.1 mL of the Grubbs catalyst solution was added to the monomer solution. The viscosity of the solution increased after 30 min 0.1 mL of DCM was added to the solution. The solution was stirred for 18 h. Methanol was added to the reaction solution to precipitate the polymer. The polymer was redissolved in DCM and reprecipitated in methanol. The solvent was removed with an oil pump equipped with a cooling trap to provide 0.16 g of the polymer.

$^1$H NMR (500 MHz, CDCl$_3$) δ: 6.95 (d, J=8.5 Hz, 2H), 6.80 (d, J=8.5 Hz, 2H), 5.38 (m, 5H), 4.20 (m, 4H), 3.76 (s, 3H), 3.02 (s, 2H), 1.96 (m, 10H), 1.75 (m, 4H), 1.30 (m, 13H).

$^{13}$C NMR (500 MHz, CDCl$_3$) δ: ppm.

M$_n$=58.5 kDa, PDI=1.89

2-2: Synthesis of trans-N-(4-methoxyphenyl) aziridine copolymer (trans-2)

trans-N-(4-methoxyphenyl) aziridine copolymer (trans-2) was synthesized following the steps shown in Reaction Scheme 2:

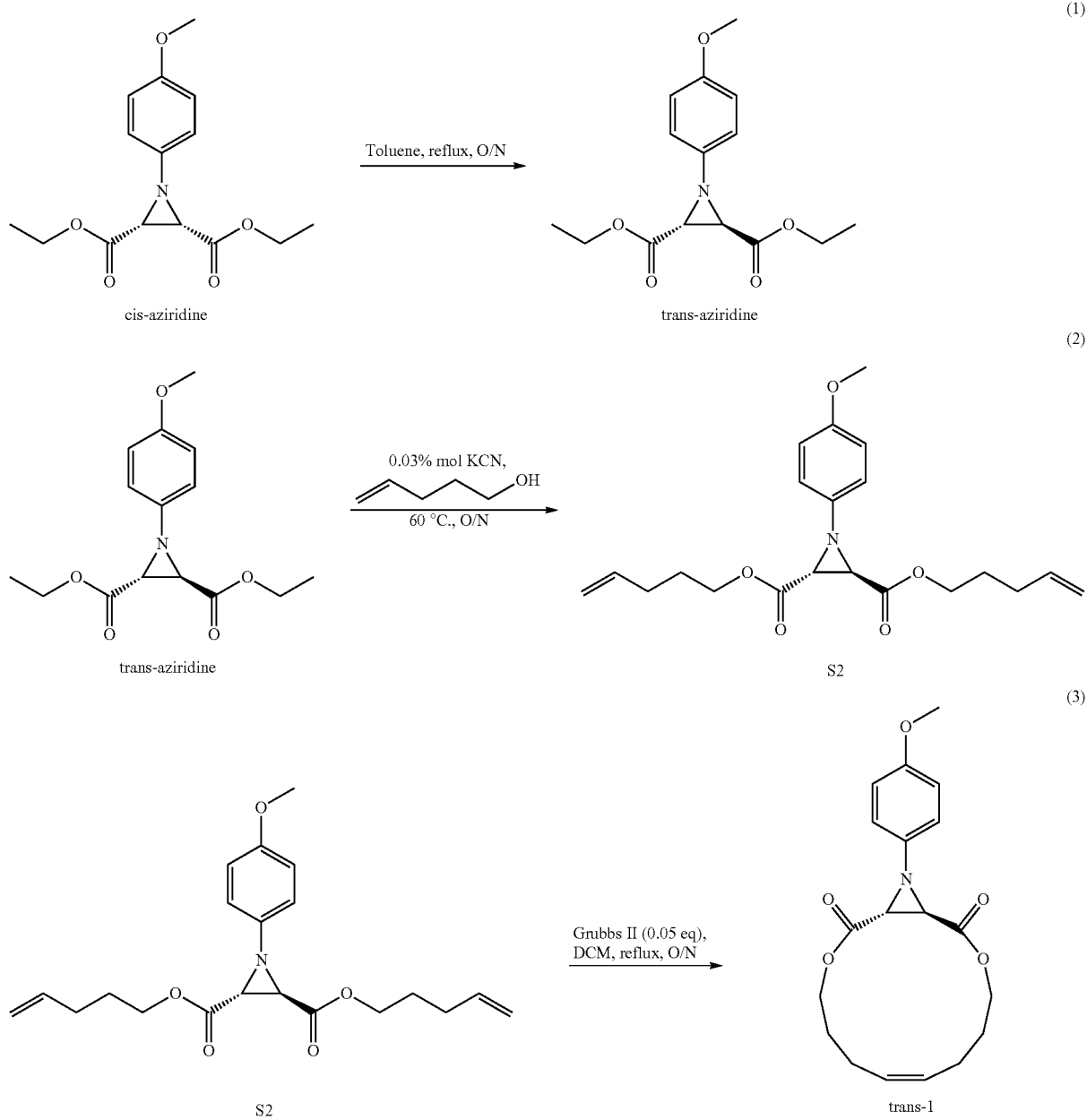

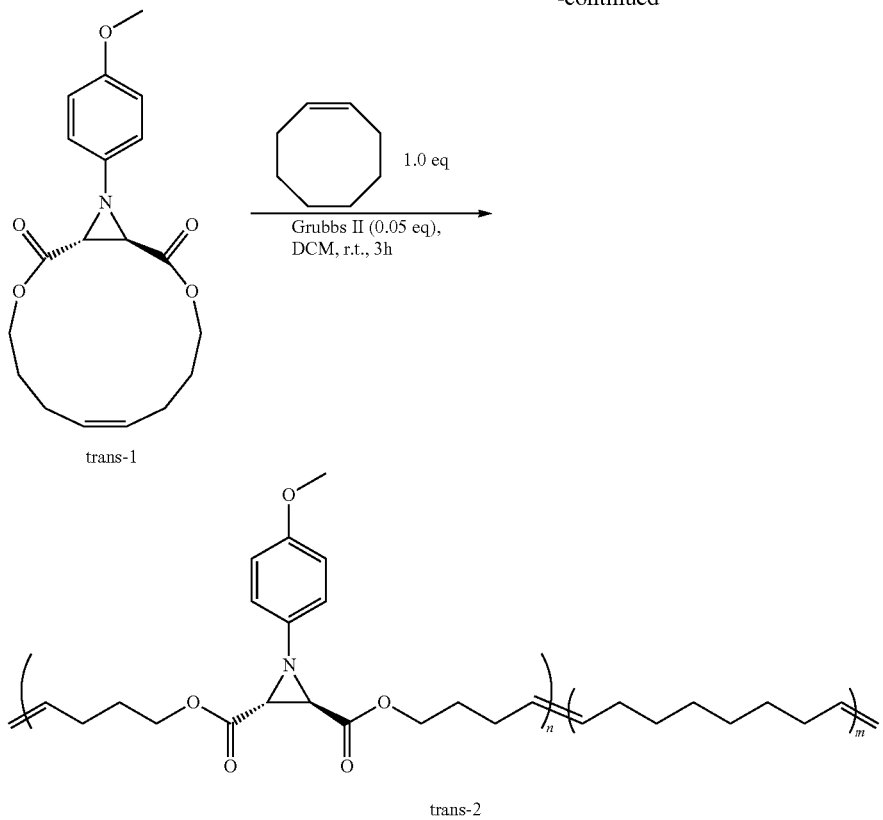

trans-1 trans-2

(1) Synthesis of (2R,3R)-diethyl 1-(4-methoxyphenyl)aziridine-2,3-dicarboxylate (trans-aziridine).

cis-aziridine (1.29 g, 4.4 mmol) was dissolved in 20 mL toluene in a round-bottom flask. The solution was refluxed for 24 h. The reaction solution was cooled to room temperature and the solvent was removed with an oil pump equipped with a cooling trap. After the mixture was diluted with water, the organic layer was extracted with DCM and dried over $MgSO_4$. The crude product was purified by silica gel column chromatography (eluent: 20% EtOAc in Hexanes) to afford trans-aziridine in a yield of 65%.

$^1$H NMR (500 MHz, $CDCl_3$) δ: 6.84 (m, 2H), 6.77 (m, 2H), 4.16 (m, 4H), 3.74 (s, 3H), 3.42 (s, 2H), 1.21 (t, J=7 Hz, 6H).

$^{13}$C NMR (500 MHz, $CDCl_3$) δ: 14.02, 42.30, 55.37, 61.76, 114.18, 120.70, 140.32, 155.83 ppm.

HRMS (ESI) m/z: [M+Na]$^+$ calcd for $C_{15}H_{20}NO_5$: 294.1341; found: 294.1336.

(2) Synthesis of (2R,3R)-di(pent-4-en-1-yl) 1-(4-methoxyphenyl)aziridine-2,3-dicarboxylate (S2)

A mixture of trans-aziridine (0.6 g, 2.05 mmol) and potassium cyanide (0.03 mol %) in pent-4-en-1-ol (20 mL) was stirred in a round-bottom flask at 60° C. for 18 h. After the mixture was diluted with water, the organic layer was extracted with DCM and dried over $MgSO_4$. The crude product was purified by silica gel column chromatography (20% EtOAc in Hexanes) to afford S2 in a yield of 54%.

$^1$H NMR (500 MHz, $CDCl_3$) δ: 6.84 (m, 2H), 6.78 (d, 2H), 5.77 (ddt, J=17, 10.3, 6.7X(2) Hz, 2H), 5.01 (m, 4H), 4.11 (m, 4H), 3.75 (s, 3H), 3.43 (s, 2H), 2.06 (m, 4H), 1.69 (m, 4H).

$^{13}$C NMR (500 MHz, $CDCl_3$) δ: 27.63, 29.83, 42.33, 55.38, 65.22, 114.27, 115.45, 120.64, 137.15, 155.89 ppm.

HRMS (ESI) m/z: [M+Na]$^+$ calcd for $C_{21}H_{27}NNaO_5$: 396.1787; found: 396.1781.

(3) Synthesis of (1R,14R)-15-(4-methoxyphenyl)-3,12-dioxa-15-azabicyclo[12.1.0]pentadec-7-ene-2,13-dione (trans-1)

S2 (0.33 g, 0.8 mmol) was dissolved in DCM (100 mL). The solution was bubbled with $N_2$ for 30 min at room temperature. Grubbs second generation catalyst (0.04 g, 0.05 mmol) was added to the solution under $N_2$. The resulting solution was refluxed for 18 h. The reaction was quenched with the addition of 1 mL of ethyl vinyl ether and the mixture was stirred for 30 min. The reaction solution was cooled to room temperature and the solvent was removed with an oil pump equipped with a cooling trap. After the mixture was diluted with water, the organic layer was extracted with DCM and dried over $MgSO_4$. The crude product was purified by silica gel column chromatography (eluent: 20% EtOAc in Hexanes) to afford trans-1 in a yield of 50%.

$^1$H NMR (500 MHz, $CDCl_3$) δ: 6.82 (m, 2H), 6.76 (d, 2H), 5.45 (m, 2H), 4.09 (m, 4H), 3.74 (s, 3H), 3.40 (s, 2H), 2.03 (m, 4H), 1.68 (m, 4H).

$^{13}$C NMR (500 MHz, $CDCl_3$) δ: 23.57, 28.12, 28.56, 42.26, 55.34, 64.95, 114.20, 120.59, 129.35, 129.91, 137.10, 140.23, 155.81, 167.00 ppm.

HRMS (ESI) m/z: [M+Na]$^+$ calcd for $C_{19}H_{23}NNaO_5$: 368.1474; found: 368.1468.

(4) Synthesis of trans-N-(4-methoxyphenyl) aziridine copolymer (trans-2)

trans-1 (0.14 g, 0.4 mmol) and cis-cyclooctene (0.044 g, 0.4 mmol) were dissolved in 0.1 mL of DCM in a round-bottom flask. 1.64 mg of Grubbs second generation catalyst was dissolved in 1 mL of DCM. 0.1 mL of the Grubbs catalyst solution was added to the monomer solution. The viscosity of the solution increased after 30 min 0.1 mL of DCM was added to the solution. The solution was stirred for 18 h. Methanol was added to the reaction solution to precipitate the polymer. The polymer was redissolved in DCM and reprecipitated in methanol. The solvent was removed with an oil pump equipped with a cooling trap to provide 0.16 g of the polymer.

$^1$H NMR (500 MHz, CDCl$_3$) δ: 6.82 (m, 2H), 6.77 (m, 2H), 5.38 (m, 5H), 4.10 (m, 4H), 3.74 (s, 3H), 3.42 (s, 2H), 1.95 (m, 10H), 1.63 (m, 4H), 1.30 (m, 10H).

$^{13}$C NMR (500 MHz, CDCl$_3$) δ: 23.39, 27.19, 28.12, 28.23, 28.59, 28.64, 29.01, 29.48, 29.60, 29.71, 32.53, 32.57, 42.33, 55.35, 65.32, 114.24, 120.63, 128.27, 129.00, 129.74, 130.31, 131.75, 140.36, 155.86, 167.09 ppm.

$M_n$=51.8 kDa, PDI=2.74.

Figure 4:
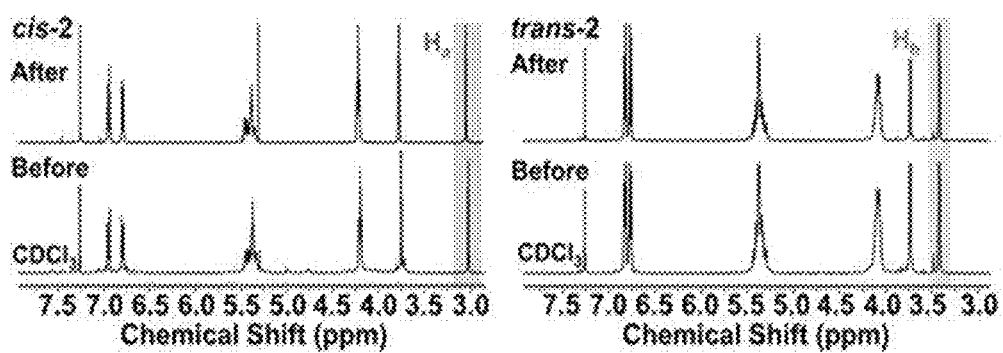
FIG. 4 shows $^1$H NMR spectra of cis-2 and trans-2 before and after 2 h of sonication at 30% amplitude.
Figure 5:
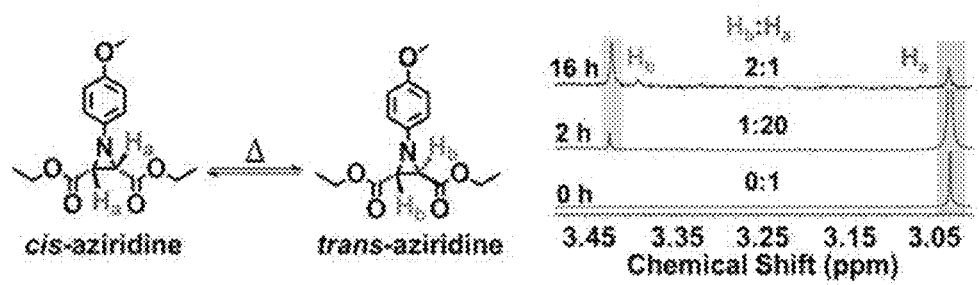
FIG. 5 shows $^1$H NMR spectra of cis-aziridine model compound (the corresponding small molecule without the macromolecular backbone) at 0 h and after 2 h and 16 h of heating at 110° C. in toluene. According to $^1$H NMR analysis, the ratio of trans to cis-isomers was 1:20 and 2:1 after 2 and 16 h, respectively.

Example 3: Mechanochemical Isomerization of the Aziridine Polymeric Compounds 3-1: Mechanochemical Isomerization of the Aziridine Polymeric Compounds Each solution of cis-2 and trans-2 in THF (1 mg/mL) was sonicated at 4-8° C. with a high intensity probe (20 kHz, 30% amplitude; pulse sequence: 1 s on/1 s off) under N$_2$. After 2 h ultrasound sonication, no changes in the $^1$H NMR spectra for cis-2 and trans-2 were observed (FIG. 4). In contrast, when cis-aziridine (i.e. cis-N-(4-methoxyphenyl) without the macromolecular backbone; FIG. 5) was exposed to a thermal condition (110° C. in toluene), isomerization was observed. Upon heating, a new proton resonance at 3.42 ppm indicative of the formation of trans-aziridine appeared in the $^1$H NMR spectra, resulting in a mixture of cis- and trans-aziridines (trans:cis=1:20 and 2:1 after 2 and 16 h, respectively; FIG. 5). This finding evidenced significant isomerization of aziridine under thermal condition whereas no isomerization occurred under mechanochemical condition.

3-2: Mechanochemical Cycloaddition of the Aziridine Polymeric Compounds

Figure 6:
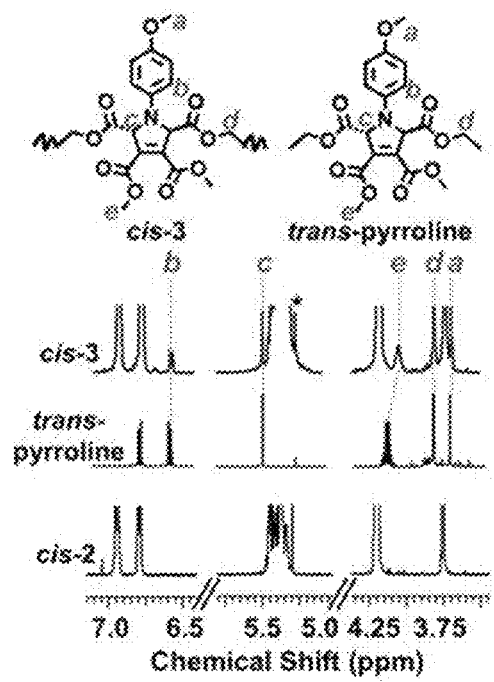
FIG. 6 shows the molecular structures of cis-3 and the corresponding model compound (trans-pyrroline) and compares $^1$H NMR spectra of the mechanochemical reactant (cis-2) and product (cis-3) and the pyrroline model compound.
Figure 7:
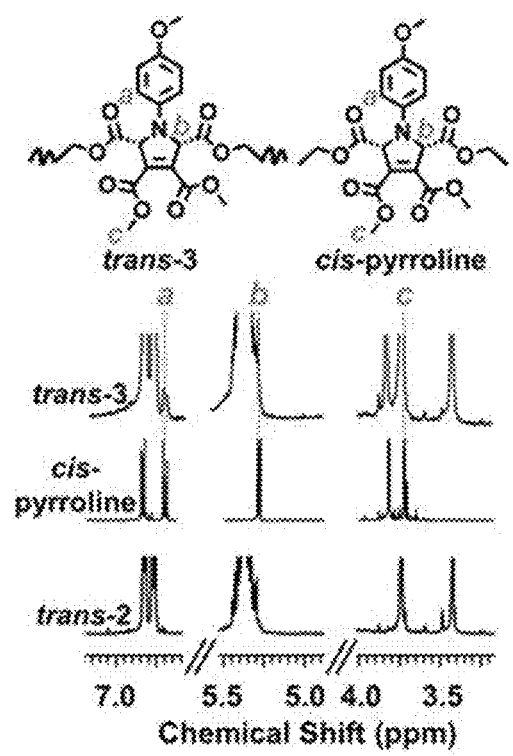
FIG. 7 shows the molecular structures of trans-3 and the corresponding model compound (cis-pyrroline) and compares $^1$H NMR spectra of the mechanochemical reactant (trans-2) and product (trans-3) and the pyrroline model compound.

Through the mechanochemical isomerization experiment, the present inventors hypothesized that aziridines may not be good mechanophores. To test this hypothesis, each of cis- and trans-2 was reacted with dimethyl acetylenedicarboxylate (DMAD) under the identical condition used for the mechanochemical isomerization experiment. After 2 h sonication, chemical shifts of new resonances in the $^1$H NMR spectra analysis were observed. For the reaction of cis-2, new proton resonances at δ=6.61, 5.52, 4.07, 3.83 and 3.72 ppm appeared (FIG. 6); similarly, $^1$H NMR spectra for the reaction of trans-2 showed new proton resonances at δ=6.71, 5.29 and 3.83 ppm (FIG. 7).

Figure 8:
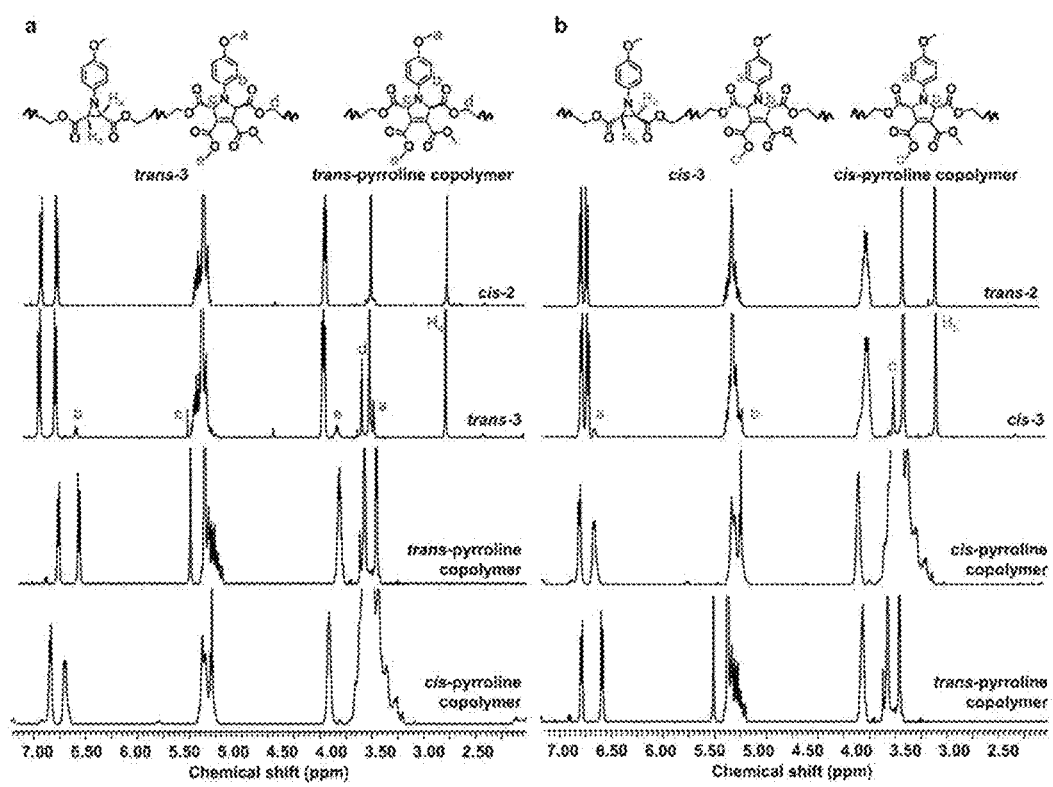
FIG. 8 shows the molecular structures and $^1$H NMR spectra for the mechanochemical formation of trans-3 from cis-2 and cis-3 from trans-2, along with $^1$H NMR spectra for the corresponding thermal products (cis-3-heat and trans-3-heat) for comparison.

After the mechanochemical reaction, the $^1$H NMR spectra of the aziridine polymers were compared with those of separately synthesized pyrroline model compounds (denoted as cis- and trans-pyrroline) to determine whether the reactions occurred. The comparison indicated that the newly formed proton resonances in the reaction products (denoted as cis- and trans-3) corresponded to the [3+2] cycloaddition products. No mixture of cis- and trans-products was observed for either reaction, thus indicating that the mechanochemical reactions were highly stereoselective (FIG. 8). In conjunction with the observation of the mechanochemical isomerization, this result implies that mechanical force induces the cycloaddition of nonactivated aziridines without the formation of azomethine ylides that result from C—C or C—N bond cleavage. It is noteworthy that cycloaddition of intact aziridines has not been reported before.

Figure 9:
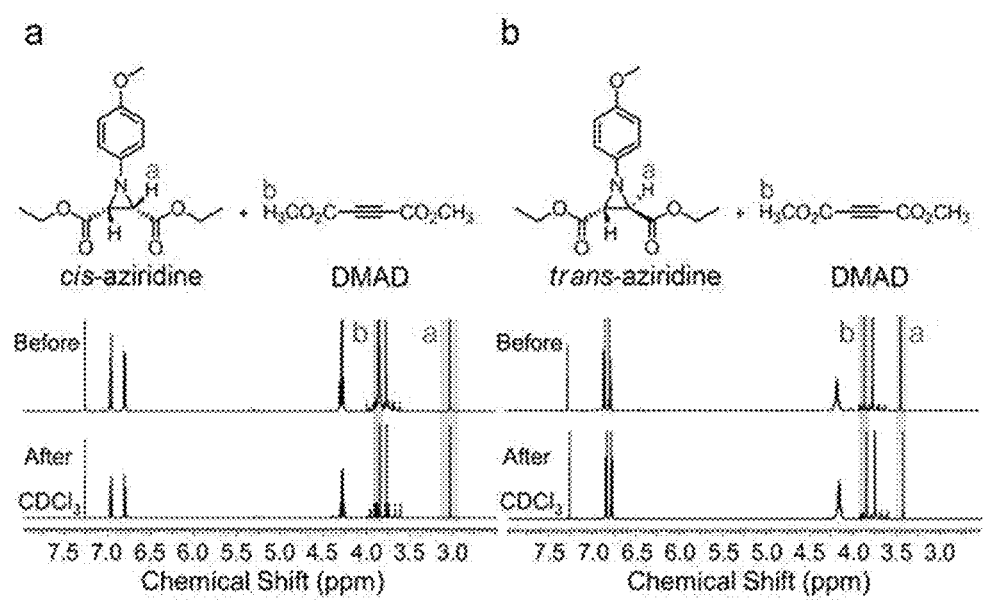
FIG. 9 shows $^1$H NMR spectra of cis- and trans-aziridine model compounds (the corresponding small molecules without the macromolecular backbone) before and after 2 h of sonication under the same conditions.

Control experiments were also conducted with small-molecule system. Large extensional shear forces are generated by pulsed ultrasound, and this is usually facilitated by a polymer backbone. Under the same sonication conditions as those for polymeric systems, cis- and trans-N-(4-methoxyphenyl) aziridine small molecules (denoted as cis-aziridine and trans-aziridine) did not react with DMAD, as evidenced by no detectable changes in the $^1$H NMR spectra (FIG. 9). This result confirms that the cycloaddition reactions triggered by pulsed ultrasound of the aziridine copolymers were caused by the extensional shear force along the polymer backbone, not by the high-pressure energy and elevated temperature generated by ultrasonic waves.

Figure 10:
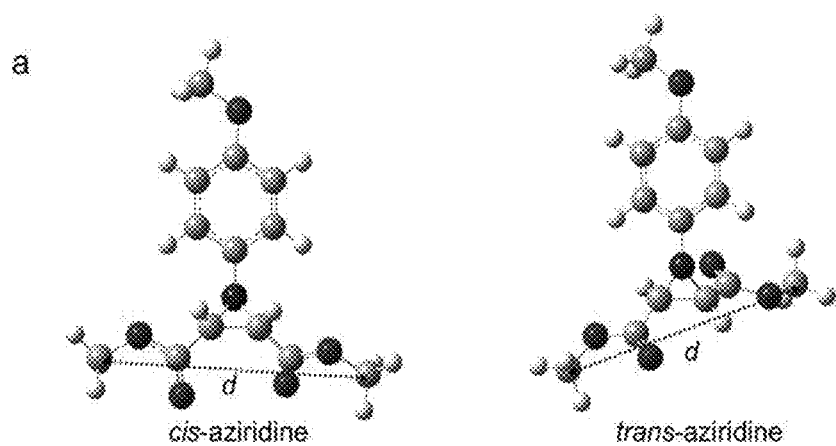
FIG. 10 shows the structures of cis- and trans-aziridines optimized for simulation of tensile stress. For both cis- and trans-aziridines, calculations were made with increasing straight-distance between methoxy groups (Δd, Å) from 0.0 to 2.05 Å.

3-3: Identification of the Mechanism of the Stereospecific Chemical Reactions of the Aziridine Polymeric Compounds by Mechanical Force To explain the mechanism of the mechanochemical cycloaddition reactions, constrained geometries for simulating external force (CoGEF) calculations using density functional theory at the B3LYP/6-31G* level were conducted. To simulate mechanical force-induced structural changes of the aziridines, the distance between the methoxy substituents (Δd, Å) increased gradually as shown in FIG. 10. cis- and trans-aziridine model compounds underwent C—C bond cleavage in the ring structure at Δd=1.70 and 1.65 Å, respectively. However, these computational results are contrary to the experimental results that the aziridine ring is not opened by a mechanical force.

Figure 11:
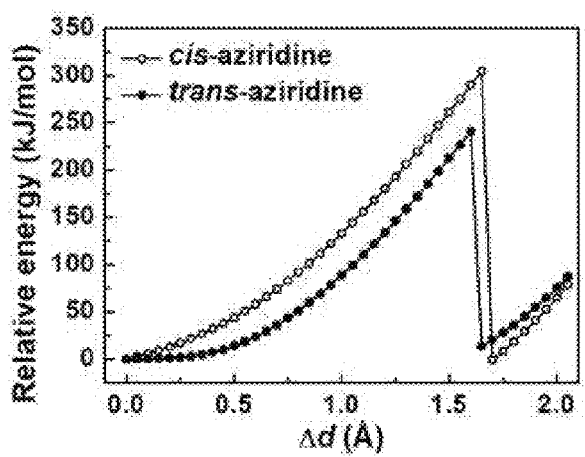
FIG. 11 shows plots of relative energy as a function of Δd.
Figure 12:
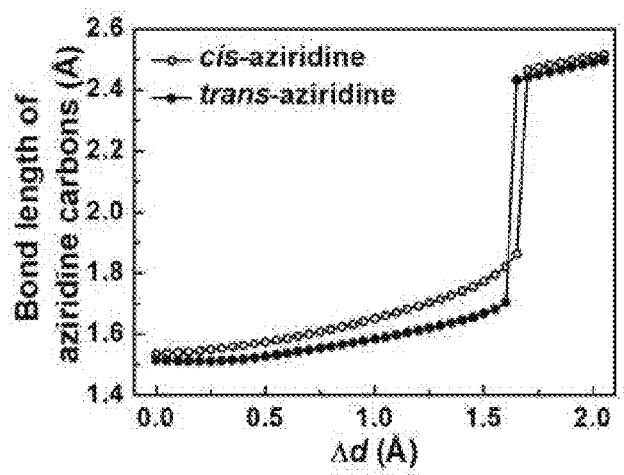
FIG. 12 shows plots of bond lengths between aziridine carbons as a function of Δd (C1-C2 and C3-C4 for cis- and trans-aziridines, respectively)
Figure 13:
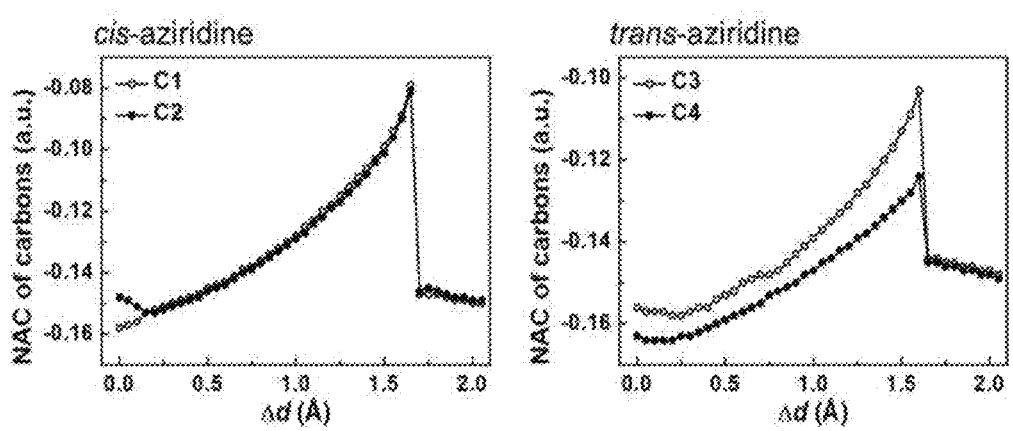
FIG. 13 shows plots of natural atomic charge of the aziridine carbon atoms as a function of Δd (C1-C2 and C3-C4 for cis- and trans-aziridines, respectively)
Figure 14:
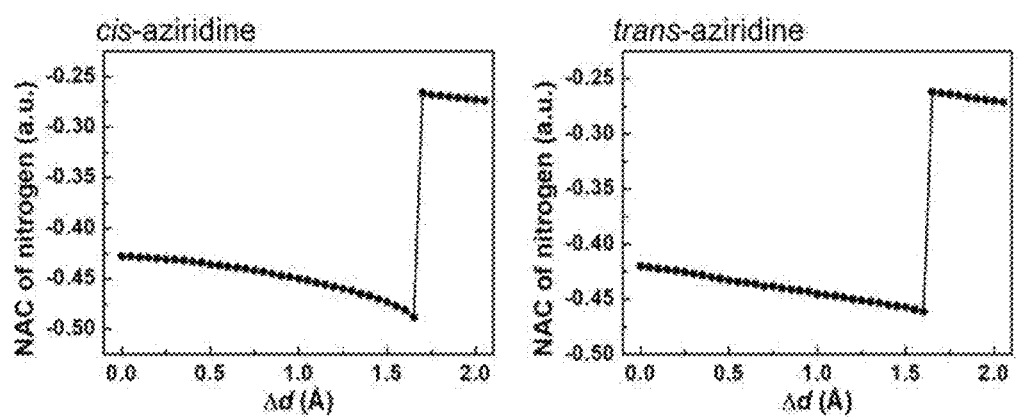
FIG. 14 shows plots of natural atomic charge of the aziridine nitrogen atom as a function of Δd.

Changes in the molecular energy of the aziridines with increasing Δd were calculated. As shown in FIG. 11, the relative energy of the aziridines increased. The relative lengths of the aziridine carbons (C1-C2 and C3-C4 for the cis- and trans-aziridines, respectively) were changed, as emphasized in FIG. 12. FIGS. 13 and 14 show changes in the natural atomic charge of the aziridine carbon and nitrogen atoms as a function of Δd.

Figure 15:
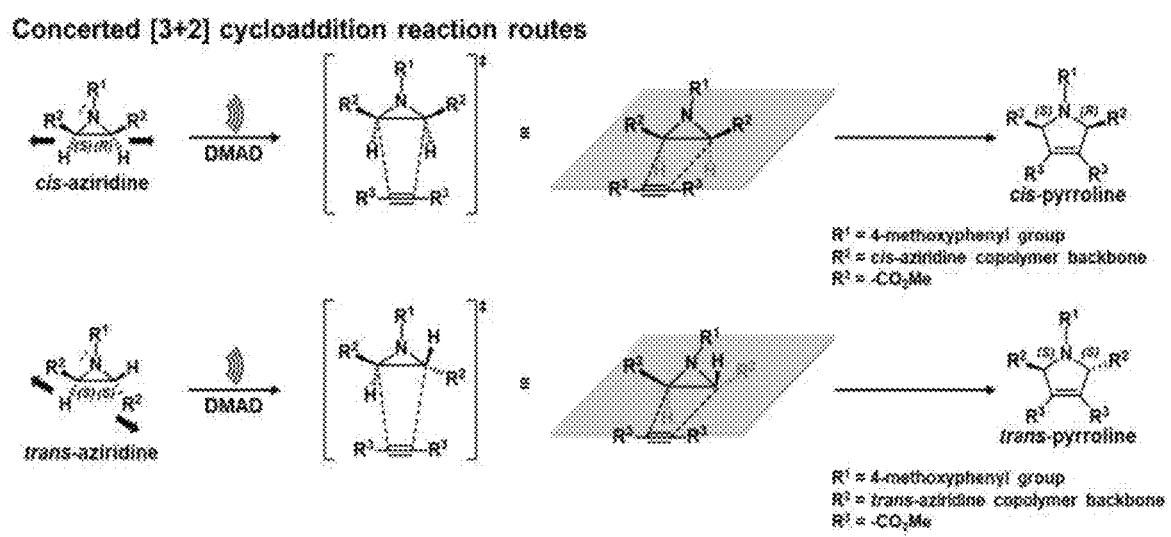
FIG. 15 shows concerted [3+2] cycloaddition reaction routes.
Figure 16:
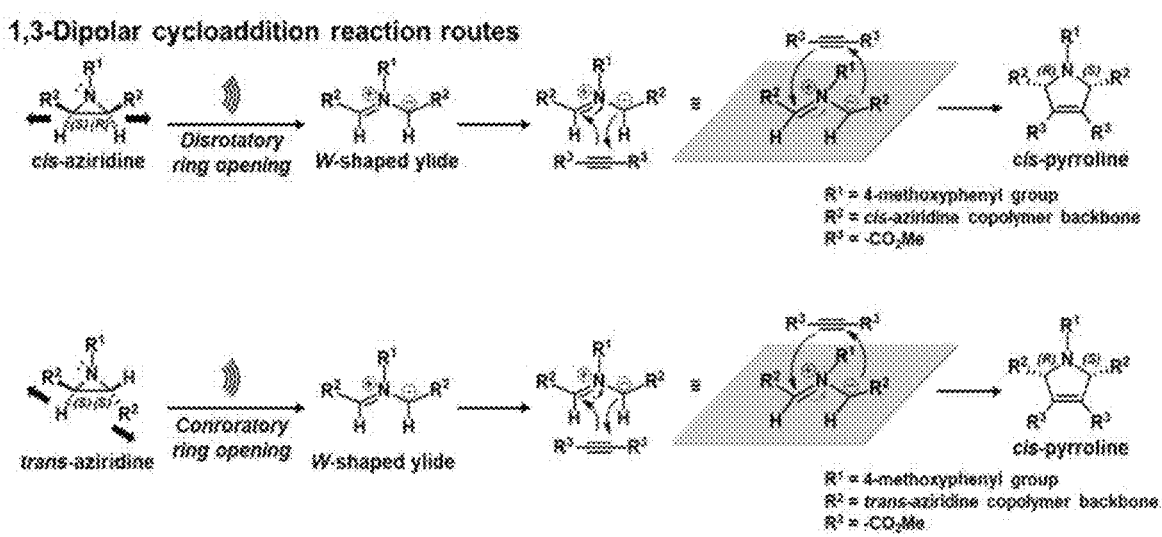
FIG. 16 shows 1,3-dipolar cycloaddition reaction routes.
Figure 17:
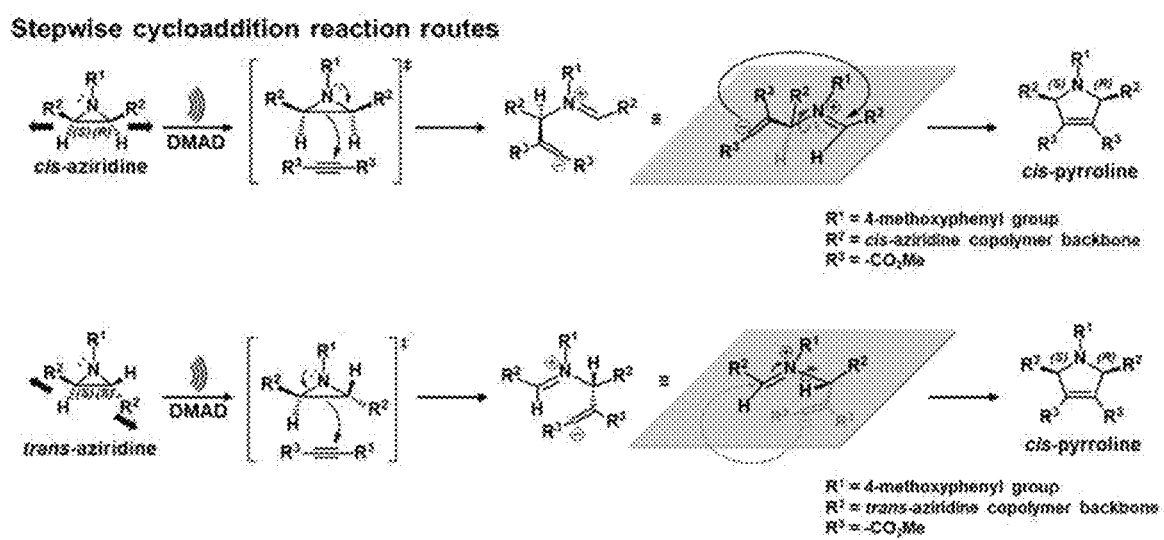
FIG. 17 shows stepwise cycloaddition reaction routes.

This simulation result is insufficient to fully explain the mechanism of the mechanochemical cycloaddition reactions of the aziridine ring. However, the experimental result confirmed that the aziridine ring is not opened by a mechanical force and cycloaddition takes place. The activated aziridines reacted with DMAD to produce pyrroline products without undergoing C—C bond cleavage by a mechanical force (FIG. 8). Since the stereospecificity of the products was not consistent with what was experimentally observed, the following possibilities were eliminated from the reaction mechanism. i) If the activated aziridines followed a concerted [3+2] cycloaddition reaction route, cis- and trans-aziridines would be converted into cis- and trans-pyrrolines, respectively (FIG. 15). ii) if the aziridines were converted into ylides under the mechanochemical conditions (this seems not true according to the present invention), disrotatory and conrotatory ring opening of cis- and trans-aziridines should yield the same W-shaped azomethine ylide and [3+2] cycloaddition of this ylide with DMAD should afford only cis-pyrroline (FIG. 16). iii) If the electron-rich nitrogen atom resulting from a mechanical force pushes lone pair electrons into the carbon atom and the carbon-carbon 6 bond attacked DMAD, dipolar intermediates with the same stereochemistry would be formed, affording only cis-pyrroline (FIG. 17).

Here, the robust ring structure of aziridines was demonstrated to react with a dipolarophile under mechanochemical conditions. This unprecedented finding suggests that a non-vulnerable chemical structure can be considered as a mechanophore for not only solving the problems in mechanochemical reactions with vulnerable mechanophores but also exploring unconventional reaction routes that are inaccessible under traditional reaction conditions. The nitrogen atom in aziridine makes it possible to control the chemical and electronic structure of the N-substituent, which holds promise for modulating the mechanochemical reactivity of aziridine mechanophore.

Although the particulars of the present disclosure have been described in detail, it will be obvious to those skilled in the art that such particulars are merely preferred embodiments and are not intended to limit the scope of the present invention. Therefore, the true scope of the present invention is defined by the appended claims and their equivalents.

What is claimed is:

1. A polymeric compound comprising a repeating unit represented by Formula 1-1:

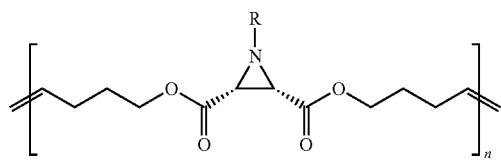

(1-1)

wherein R is

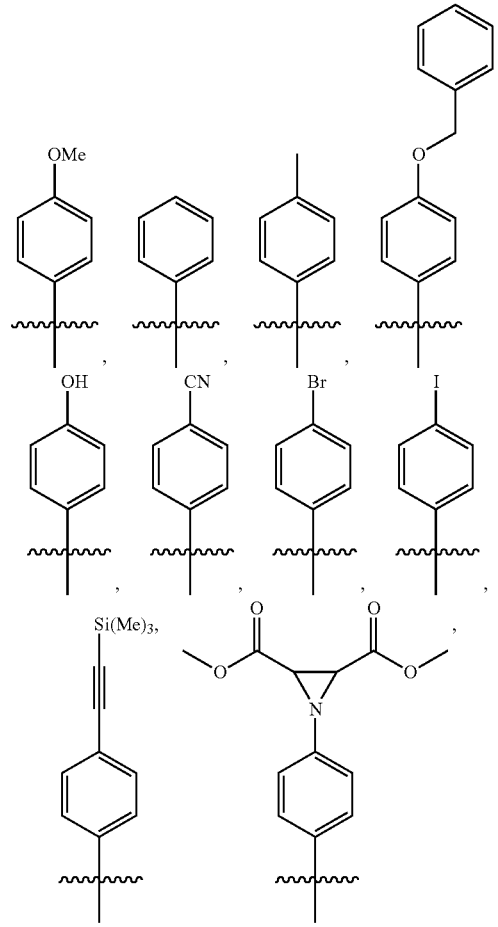

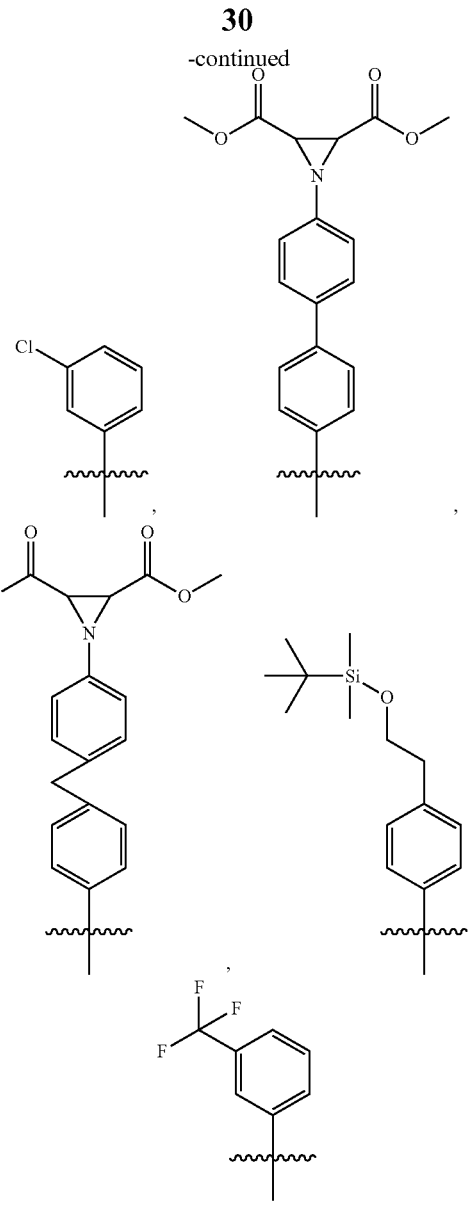

and n is an integer from 123 to 125, and
a repeating unit represented by Formula 1-2:

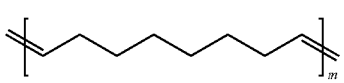

(1-2)

wherein m is an integer from 123 to 125.

2. A polymeric compound comprising a repeating unit represented by Formula 2-1:

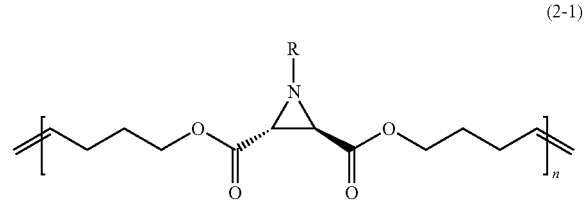

(2-1)

wherein R is
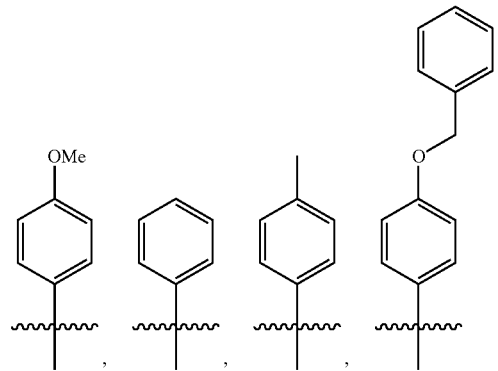
and n is an integer from 108 to 110, and
a repeating unit represented by Formula 2-2:
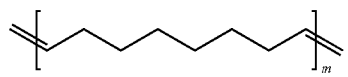
(2-2)
wherein m is an integer from 108 to 110.
3. The polymeric compound according to claim 1, wherein the polymeric compound is represented by Formula 1:
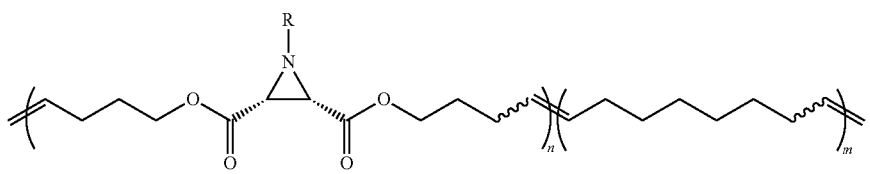
(1)

wherein
R is
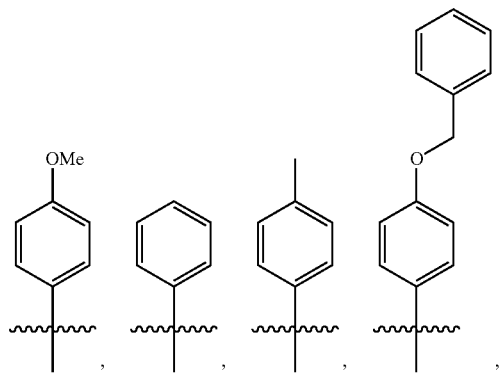
and each of n and m is an integer from 123 to 125.
4. The polymeric compound according to claim 2, wherein the polymeric compound is represented by Formula 2:
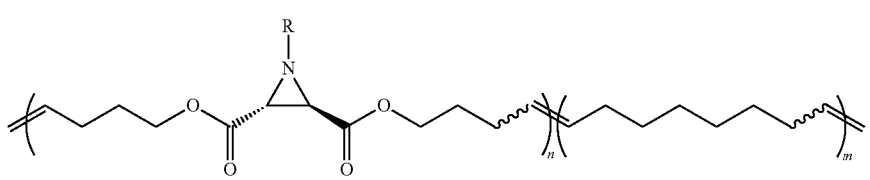
(2)

wherein
R is

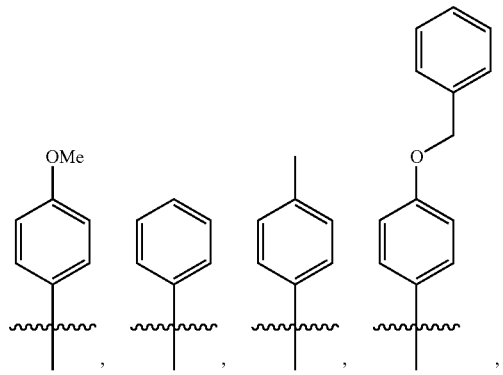

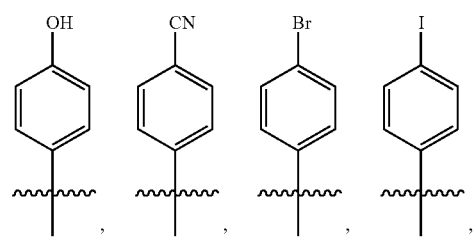

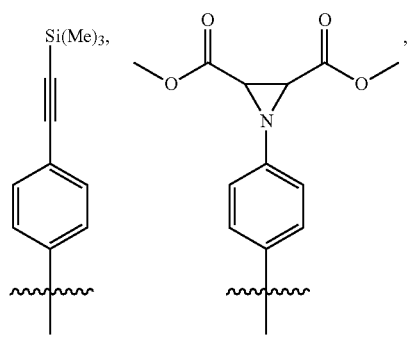

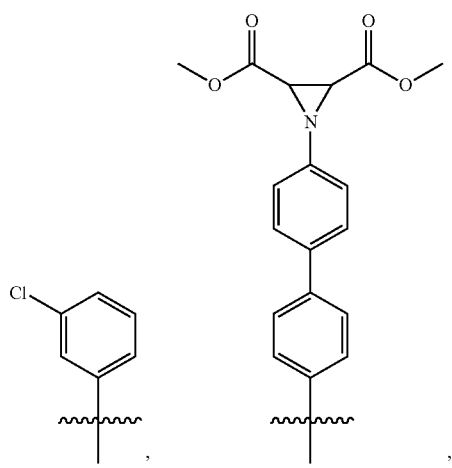

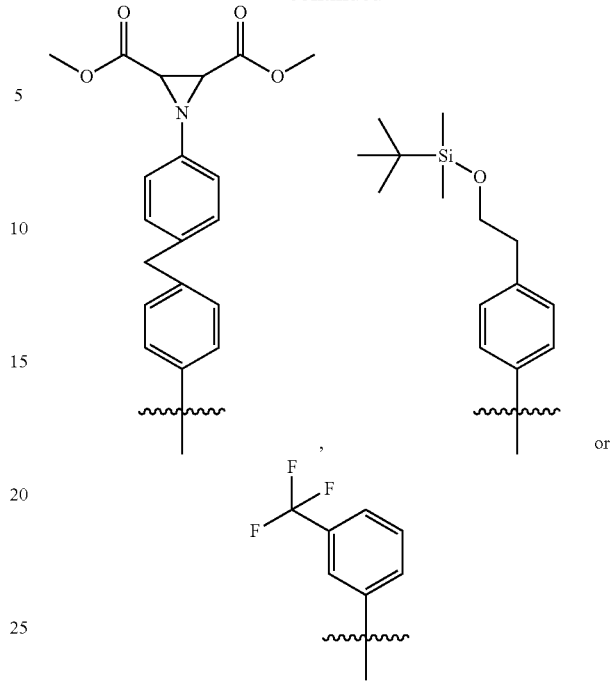

and each of n and m is an integer from 108 to 110.

5. The polymeric compound according to claim 1, wherein the polymeric compound is prepared by mechanical force-induced cycloaddition.

6. The polymeric compound according to claim 2, wherein the polymeric compound is prepared by mechanical force-induced cycloaddition.

7. A method for preparing the polymeric compound of claim 1 comprising:
polymerizing cis-cyclooctene represented by Formula 3, and

(3)

an aziridine monomer represented by Formula 4,

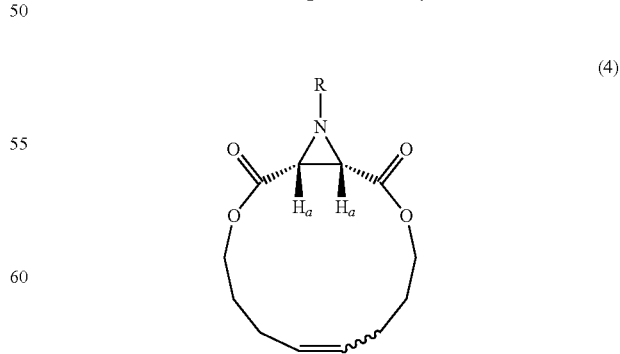

(4)

wherein R is as defined in Formula 1-1.

8. A method for preparing the polymeric compound of claim 2 comprising:

polymerizing cis-cyclooctene represented by Formula 3,
and

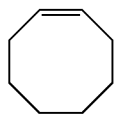 (3)

an aziridine monomer represented by Formula 5,

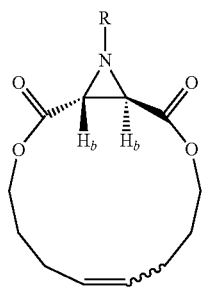 (5)

wherein R is as defined in Formula 2-1.

9. The method according to claim 7, wherein the polymerization is performed by entropically driven ring-opening metathesis copolymerization.

10. The method according to claim 8, wherein the polymerization is performed by entropically driven ring-opening metathesis copolymerization.

11. The method according to claim 7, wherein the cis-cyclooctene and the aziridine monomer are used in a molar ratio of 1:0.5 to 1:1.5.

12. The method according to claim 8, wherein the cis-cyclooctene and the aziridine monomer are used in a molar ratio of 1:0.5 to 1:1.5.

13. The method according to claim 7, wherein the polymerization is performed in the presence of Grubbs $2^{nd}$ catalyst.

14. The method according to claim 8, wherein the polymerization is performed in the presence of Grubbs $2^{nd}$ catalyst.

* * * * *